US012003650B2

(12) United States Patent
Tomlinson et al.

(10) Patent No.: US 12,003,650 B2
(45) Date of Patent: Jun. 4, 2024

(54) DATA COMMUNICATION BETWEEN A GROUP OF USERS

(71) Applicant: PQ Solutions Limited, London (GB)

(72) Inventors: Martin Tomlinson, Totnes (GB); Andersen Cheng, London (GB); Cen Jung Tjhai, London (GB)

(73) Assignee: PQ Solutions Limited, London (GB)

( * ) Notice: Subject to any disclaimer, the term of this patent is extended or adjusted under 35 U.S.C. 154(b) by 263 days.

(21) Appl. No.: 17/642,195

(22) PCT Filed: Sep. 10, 2020

(86) PCT No.: PCT/GB2020/052181
§ 371 (c)(1),
(2) Date: Mar. 10, 2022

(87) PCT Pub. No.: WO2021/048549
PCT Pub. Date: Mar. 18, 2021

(65) Prior Publication Data
US 2022/0311623 A1  Sep. 29, 2022

(30) Foreign Application Priority Data

Sep. 11, 2019  (GB) .................................... 1913115

(51) Int. Cl.
*H04L 29/06*  (2006.01)
*H04L 9/00*  (2022.01)
(Continued)

(52) U.S. Cl.
CPC ............ *H04L 9/3255* (2013.01); *H04L 9/008* (2013.01); *H04L 9/085* (2013.01)

(58) Field of Classification Search
None
See application file for complete search history.

(56) References Cited

U.S. PATENT DOCUMENTS 6,088,454 A * 7/2000 Nagashima ........... H04L 9/3255
713/180
8,290,161 B2 * 10/2012 Yung ..................... H04L 9/0838
380/255

(Continued)

OTHER PUBLICATIONS

International Search Report and Written Opinion for App. No. PCT/GB2020/052181, dated Nov. 23, 2020, 4 pages.

(Continued)

*Primary Examiner* — Maung T Lwin
(74) *Attorney, Agent, or Firm* — Butzel Long

(57) ABSTRACT

Systems and methods are described for implementing communication of data between a group of users in a communication system. In one implementation, a plurality of quorum portions of a private group signing key are generated and provided to each of a plurality of devices of the group of users, wherein a group digital signature is reconstructed from a predetermined minimum number of encrypted portions of the group digital signature, each generated by a respective device of the group of users using a corresponding quorum portion of the private group signing key. Each user device may digitally sign group output data using a respective private group signing key portion. A reconstructed group digital signature may be verified using a corresponding public group signing key. Other embodiments are also described and claimed.

18 Claims, 19 Drawing Sheets

(51) Int. Cl.
  *H04L 9/08*  (2006.01)
  *H04L 9/32*  (2006.01)

(56) References Cited

U.S. PATENT DOCUMENTS

| | | | |
|---|---|---|---|
| 8,645,698 B2* | 2/2014 | Yi | H04L 9/085 |
| | | | 713/180 |
| 2004/0015724 A1* | 1/2004 | Pham | H04L 63/12 |
| | | | 713/181 |
| 2008/0181413 A1 | 7/2008 | Yi | |
| 2011/0194694 A1* | 8/2011 | Struik | H04L 9/3252 |
| | | | 380/255 |
| 2021/0067345 A1* | 3/2021 | Shamai | H04L 9/085 |

OTHER PUBLICATIONS

Mctor Shoup: "Practical Threshold Signatures", IACR, International Association for Cryptologic Research, Aug. 26, 2000 (Aug. 26, 2000), pp. 1-16, XP061000062.

Harn L: "Group-oriented (t, n) threshold digital signature scheme and digital multisignature", IEE Proceedings: Computers and Digital Techniques, IEE, GB, vol. 141, No. 5, Jan. 1, 1994 (Jan. 1, 1994), pp. 307-313, XP006001608, ISSN: 1350-2387, DOI: 10.1049/IP-CDT:19941293.

* cited by examiner

DATA COMMUNICATION BETWEEN A GROUP OF USERS

FIELD OF THE INVENTION

This invention relates to data communication, and more particularly to systems and methods for implementing communication of data between a group of users in a communication system.

BACKGROUND OF THE INVENTION

Systems and applications for group-based data communications are well-known, in which data messages and files are exchanged between individual member users of a particular group. As one example, conventional instant messaging platforms allow for the formation of groups of users, where any message sent by a member of the group is transmitted to each other member of the group, and viewable by all members of the group. As another example, conventional file sharing platforms allow for the assignment of group members to a particular file or directory in a file system, to control access rights and transmission of the data to the individual group members. There are many circumstances where an ad hoc group of people come together electronically to perform a collective task for which they have shared responsibility and are accountable for their actions.

What is needed are concrete and practical solutions that provide for irrevocable and irrefutable binding of group data to group members.

STATEMENTS OF THE INVENTION

Aspects of the present invention are set out in the accompanying claims.

In one exemplary aspect, methods are provided for individuals to commit irrevocably and verifiably to membership of an ad hoc group. For example, one method implements communication of data between a group of users in a communication system, by generating a plurality of quorum portions of a group signing key, and providing at least one of said quorum portions of the group signing key to each of a plurality of devices of the group of users, wherein a digital group signature is reconstructed from a predetermined minimum number of portions of the digital group signature, each generated by a respective device of the group of users using a corresponding quorum portion of the group signing key.

Each user device may digitally sign group output data using a respective group signing key portion. The digital group signature may be reconstructed from a received plurality of portions of the group signature. The group signing key may be a private group signing key and the reconstructed digital group signature may be verified using a corresponding public group signing key.

A predefined minimum number of devices of the group of users may be configured to form a chain of quorum devices to generate a quorum signing key component using their respective quorum portions of the private group signing key. A quorum-signed portion of the group signature may be received from one of the group devices, generated by the device using the quorum signing key component to digitally sign group data that is output by the group of users. The group data output may comprise one or more data files and/or communication events produced by the group of users. The digital group signature may be reconstructed from the received quorum portions and the received quorum-signed portion of the private group signing key.

Each received portion of the digital group signature may be decrypted, where each portion is encrypted by the respective device of the group of users using a public group encryption key, and where each portion is decrypted using a corresponding private group decryption key.

The method may further comprise generating, by the server, a plurality of quorum portions of the group decryption key; providing, by the server, at least one of said quorum portions of the group decryption key to each of a plurality of devices of a decryption group; and receiving, by the server, decrypted portions of the digital group signature, each portion encrypted by the respective device of the group of users using the public group encryption key, and decrypted by a predetermined minimum number of devices of the decryption group.

Each quorum portion of the group signing key may comprise respective contributing shares of first and second components of the group signing key. The received portions of the digital group signature may each be generated from the respective contributing shares of each user in the group. The plurality of quorum portions of the group signing key may be generated using secret parameters that are not communicated by the server or the users in the group. The group signing key and the plurality of quorum portions of the group signing key may be purged from the server after provision to the group devices. Check ciphertexts may be generated and verified, by the server, to determine that the received quorum portions are constructed correctly.

The group of users may be selected from individuals that have used their devices to produce and return an irrevocable message, generated by digitally signing a commitment message with a cryptographic signature. Advantageously, this provides an irrevocable and irrefutable electronic binding to the group where each person commits themselves to the group and to the outputs of the group.

In a further exemplary aspect, a cryptographic key for signing by the group is distributed to all members of the group as signing key shares to be used by the group in a collective manner to produce a digital signature to documents, files or other outputs originated by the group. Advantageously, this facilitates construction of an audit trail for analysis of the activities of the group.

In a further exemplary aspect, a public key of an encryption system is issued to members of the group so that they may encrypt their signature components to keep these confidential from each other and to ensure that the digital signature is produced collectively as an encryption of the digital signature. In another exemplary aspect, the corresponding private key of the encryption system above is issued to a member of a decryption group as private key shares such that a sub group of users may be elected as a quorum to decrypt the digital signature ciphertext, so as to produce the digital signature. Decryption group members may overlap ad hoc group members.

In yet another exemplary aspect, there is provided a computer-implemented method comprising receiving, by a device of a user in a group of users in a communication system, a quorum portion of a group signing key, communicating, by the device, a group data output to devices of other users in the group, generating, by the device, a portion of a digital group signature by digitally signing the group data output based at least on the received quorum portion of the group signing key, and transmitting, by the device, the generated portion of the digital group signature to a server in the communication system, wherein the server verifies a digital group signature reconstructed from a predetermined minimum number of portions of the digital group signature generated by respective devices of the group of users.

A group public encryption key may be received, and the generated portion of the digital group signature may be encrypted using the group public encryption key. The method may further comprise generating, by a chain of quorum devices including the device, a quorum signing key component using respective quorum portions of the group signing key, wherein the quorum signing key component is used to sign the data output by the group of users to generate the portion of the digital group signature.

According to another exemplary aspect, methods are provided for digitally signing of data by a group of users in a communication system, comprising:
  receiving, by each of a plurality of devices of the group of users, at least one of a plurality of quorum portions of a group signing key from a server of the communication system;
  generating, by a first one of the plurality of devices in series, a first encrypted partial signature, using a secret random value that is not shared by the first device, and an encrypted seed signature received from the server;
  transmitting, by the first device, the first encrypted partial signature to a next one of the plurality of devices;
  generating, by each remaining one of the plurality of devices, a subsequent encrypted partial signature, using a respective secret random value that is not shared by the device, and an encrypted partial signature received from a previous device in the series;
  generating, by each of the plurality of devices, an encrypted group signature quorum portion, using corresponding quorum portions of the group signing key, and the encrypted partial signature generated by the final device in the series; and
  transmitting, by each of the plurality of devices, the encrypted group signature quorum portion to the server, wherein a predetermined minimum number of the encrypted group signature quorum portions is combined, decrypted and verified.

According to yet another exemplary aspect, methods are provided for forming a group of authorised users of a communication system comprising:
  storing, by a server in the communication system, public keys of users of the communication system;
  receiving, by the server, a digital signature associated with a communication group from a device associated with one of said users, the digital signature generated using a private key of the user to encrypt commitment data associated with the user, the commitment data including user-specific information and group-specific information;
  generating, by the server, a corresponding verification signature using the public key of the user to encrypt the commitment data associated with the user;
  verifying, by the server, an identity of the user for membership in the communication group, based on a comparison of the received digital signature and the corresponding verification signature; and
  forming, by the server, the communication group by selecting verified users of the communication system to be added to the communication group.

In further aspects, the present invention provides a system comprising means for performing the above methods. In yet other aspects, there is provided one or more computer programs arranged to carry out the above methods when executed by one or more programmable devices.

BRIEF DESCRIPTION OF THE DRAWINGS

There now follows, by way of example only, a detailed description of embodiments of the present invention, with references to the figures identified below.

FIG. 9, which comprises

DETAILED DESCRIPTION OF EMBODIMENTS OF THE INVENTION

Embodiments of the invention will now be described of a data communication system in which individual users of the system can irrefutably commit to an ad hoc group, and collectively construct and apply a group digital signature to data created by the group and communicated between users of the group, in a confidential manner. The group digital signature can then be verified to check that the data was generated and transmitted by the corresponding ad hoc communication group.

Figure 1:
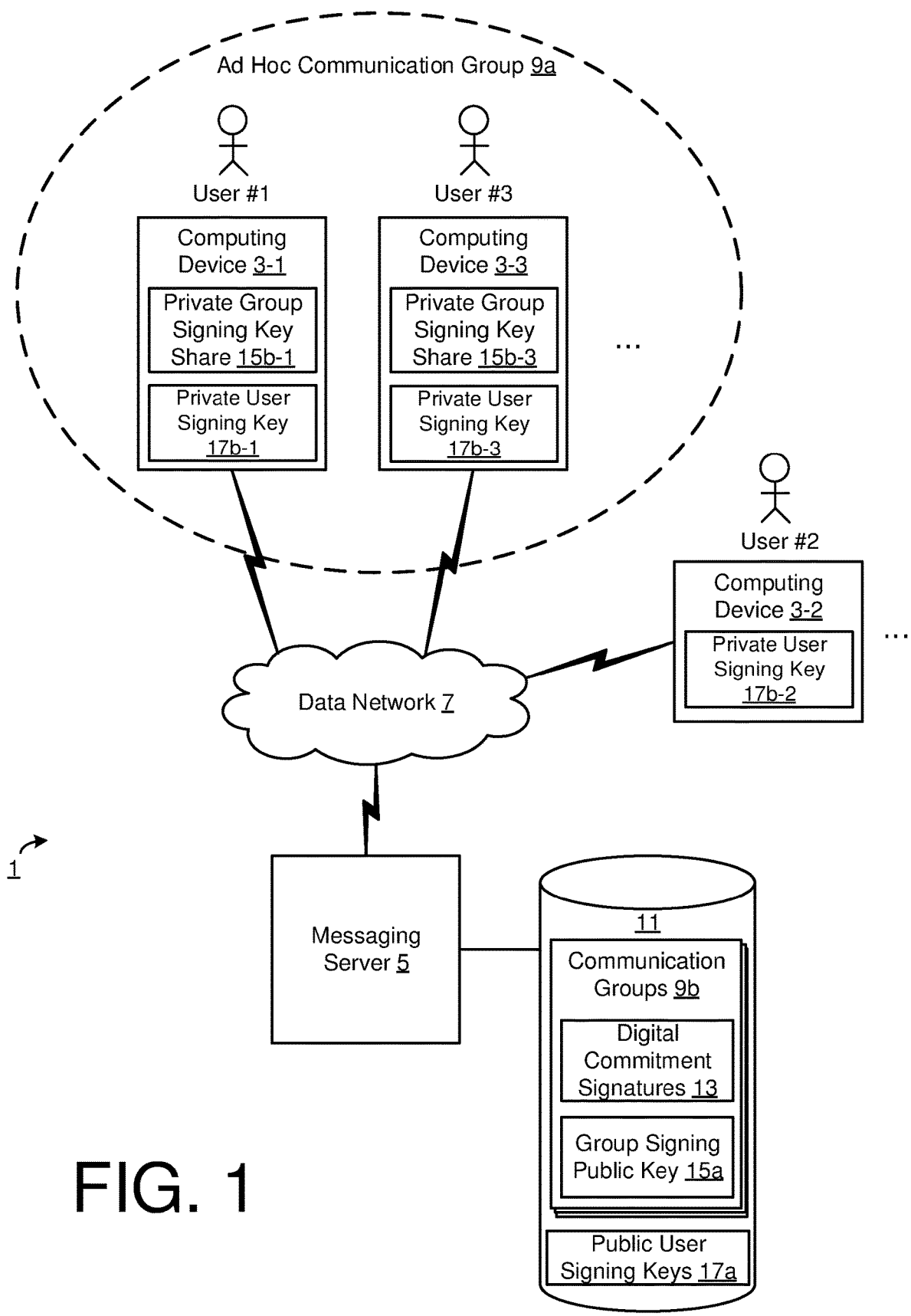
FIG. 1 is a block diagram of an exemplary data communication system, according to embodiments of the present invention.

Referring to FIG. 1, an exemplary data communication system 1 comprises a plurality of computing devices 3, each computing device in communication with at least one other computing device 3 via a messaging server 5 and a data network 7. The plurality of computing devices 3-1, 3-2, 3-c, . . . are associated with respective users #1, #2, #3, . . . of the system 1. In the present exemplary embodiment, a plurality of users #1, #3, . . . form a communication group 9 to share group data outputs between respective computing devices 3-1, 3-3, . . . in the group. The communication group 9a may be an ad hoc group of users that is constituted prior to formation of the communication group 9 by the messaging server 5. The messaging server 5 stores data associated with each communication group 9b in a memory 11, including digital commitment signatures 13 from users in the group and a public group signing key 15a. The digital commitment signatures 13 irrevocably and verifiably bind the respective user's membership to the group. The public group signing key 15a is used to verify group data outputs signed by computing devices 3 in the group using corresponding private group signing key shares 15b. The messaging server 5 may also store public signing keys 17a of each user that may be used to verify data signed by respective computing devices 3 using the corresponding private user signing keys 17b.

The computing devices 3 may be of a type that is known per se, such as a desktop computer, laptop computer, a tablet computer, a 'smart' phone, a personal digital assistant (PDA), or any processor-powered device with suitable input and display means. The data network 7 may comprise a terrestrial cellular network such as a 2G, 3G, 4G and/or 5G network, a private or public wireless network such as a WiFi™-based network and/or a mobile satellite network or the Internet. It will be appreciated that a plurality of devices 3 are operable concurrently within the system 1, and each device 3 may be associated with one or more of the users of the system 1. Each user and respective device 3 may also be associated with a plurality of different communication groups 9a. It will also be appreciated that the processing modules of the messaging server 5 may be included in one or more of the computing devices 3.

Figure 2:
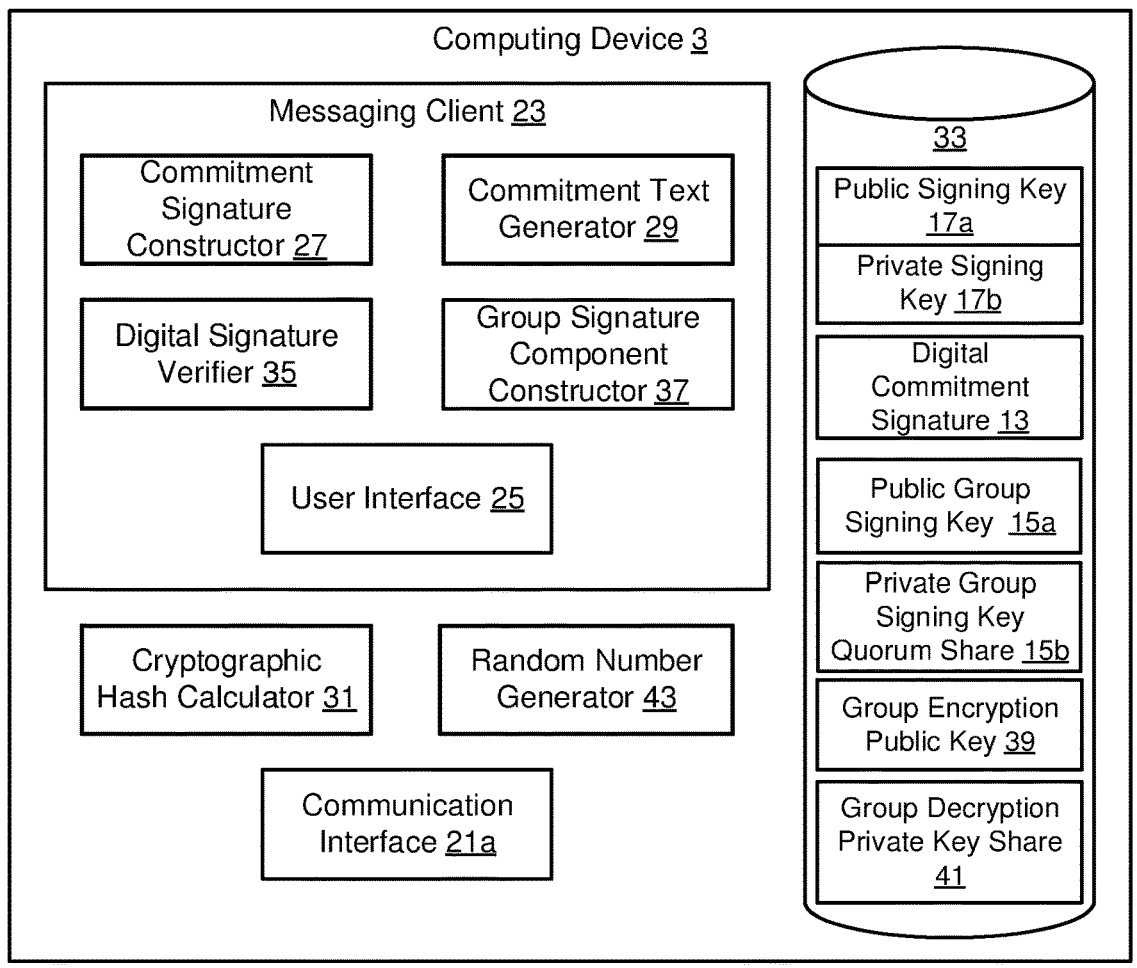
FIG. 2 is a block diagram of a computing device as shown in FIG. 1, according to embodiments of the present invention.

An exemplary computing device 3 in the data communication system 1 will now be described in more detail with reference to FIG. 2, which shows the main computing elements of the computing device 3 used in embodiments of the present invention. As shown, the computing device 3 includes a communication interface 21a for transmitting data to, and receiving data from, the messaging server 5 and other computing devices 3 in the system 1. The computing device 3 is configured to execute a messaging client (or software application) 23, having a user interface 25 for the user to generate, edit and transmit group data outputs to other users in an established communication group, and for displaying transmitted and received group data outputs from other users in the group. The group data outputs may include data files and/or communication events such as messages, and stored for example in a memory 33 of the respective devices 3. Data communicated by the messaging client 23 may be digitally signed using the private signing key 17b of the user, enabling verification and validation by a recipient using the corresponding public user signing key 17a.

In this exemplary embodiment, the messaging client 23 includes a commitment signature generator module 27 for the computing device 3 to generate digital commitment signatures 13 that irrevocably and verifiably bind the associated user to respective communication groups 9. Each digital commitment signature 13 may be generated based on a user and group specific commitment text that is signed by the user's private signing key 17b. Preferably but not essentially, the commitment signature generator module 27 generates a digital commitment signature 13 from at least a portion of a hash value computed from the commitment text, for example by a cryptographic hash calculator module 31 of the computing device 3. A commitment text generator module 29 may be provided for the messaging client 23 to construct the user and group specific commitment text from data elements unique to the corresponding user and communication group. The digital commitment signatures 13 are transmitted by the messaging client 23 to the messaging server 5, and may also be stored in a memory 33 of the computing device 3. A digital signature verifier module 35 may be provided for the computing device 5 to verify a digital commitment signature 13 from another user, for example to attest that user is a member of a group in question.

In another exemplary embodiment, a quorum of group members is required in order to produce a group digital signature that can be verified, for example to attest that group data outputs are generated and/or transmitted by computing devices 3 in the group. The messaging client 23 includes a group signature component constructor module 37 for the computing device 3 to generate a user-specific component of the group signature using the respective private group signing key share 15b. As will be described in greater detail below, a predefined minimum number of members of the communication group 9 have to cooperate together to produce the group digital signature. In yet another exemplary embodiment, the group signature component constructor module 37 is configured to produce an encrypted user-specific component of the group signature, for example using a public group encryption key 39 provided by the messaging server 5. In this way, an encrypted group digital signature is produced by a quorum of the communication group members, which can be subsequently decrypted to recover the group's digital signature. Decryption of the encrypted group digital signature may be performed for example by the messaging server 5, or by a dedicated decryption group consisting of computing devices 3 having a respective group decryption private key share 41 provided by the messaging server 5. The computing device 3 may also include a random number generator module 43 to generate random numbers used by the group signature component constructor module 37, for example.

Figure 3:
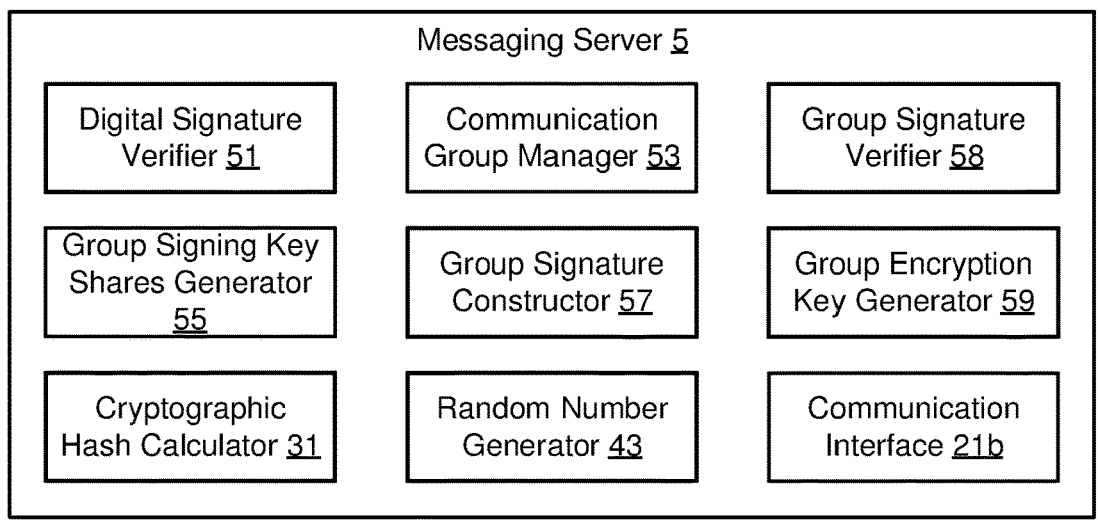
FIG. 3 is a block diagram of the messaging server shown in FIG. 1, according to embodiments of the present invention.

The messaging server 5 in the data communication system 1 will now be described in more detail with reference to FIG. 3, which shows the main computing elements of the messaging server 5 used in embodiments of the present invention. As shown, the messaging server 5 may include a complementary communication interface 21b for transmitting data to, and receiving data from, computing devices 3 in the system 1. In one exemplary embodiment, a digital signature verifier 51 is provided for the messaging server 5 to validate a digital commitment signature 13 received from a computing device 3, using the corresponding public user signing key 17a, for example to verify an identity of the user for membership in a communication group, and/or to attest that user is a member of a group in question. The server 5 may also include a corresponding cryptographic hash calculator module 31 to calculate a hash value of an input commitment text. The messaging server 5 may also include a communication group manager module 53 for forming and maintaining the communication group data 9b. For example, the group manager module 53 may form a communication group 9 by selecting verified users of the system 1 to be added to the communication group.

In the present exemplary embodiment, the messaging server 5 includes a group signature constructor module 57 to reconstruct a group digital signature from a plurality of group signature quorum portions received from a quorum of group member devices 3. In an alternative embodiment, the group signature may be reconstructed by the quorum of group member devices 3. The server 5 includes a group signing key shares generator 55 to generate private group signing key shares 15b for distribution to the group member devices 3. A group signature verifier module 58 may also be provided for the server 5 to verify the reconstructed group signature. The server 5 may also include a group encryption key generator module 59 to generate public and private components of the public group encryption key 39, for use in encrypting and decrypting the group signature quorum portions. The server 5 may also include a random number generator module 43 to generate random numbers used by the group signing key shares generator 55 and the group encryption key generator 59, for example.

Advantageously, aspects of the described embodiments enable interaction between members of an ad hoc communication group in a confidential manner, by eliminating the risk that vital secret information for group signing is revealed to other users and/or fraudsters and eavesdroppers. Additionally, aspects of the described embodiments enable verification and authentication of the identity of group members, as well as validation that nobody else, apart from verified users bound to a communication group, could have generated and transmitted a group signed data output.

It should be appreciated that the illustrated modules may be combined into a single module or divided into additional modules. The computing device 3 and server 5 may also include other components, sub-components, modules, and devices commonly found in a computing system/device, which are not illustrated in the Figures for clarity of the description.

Figure 4:
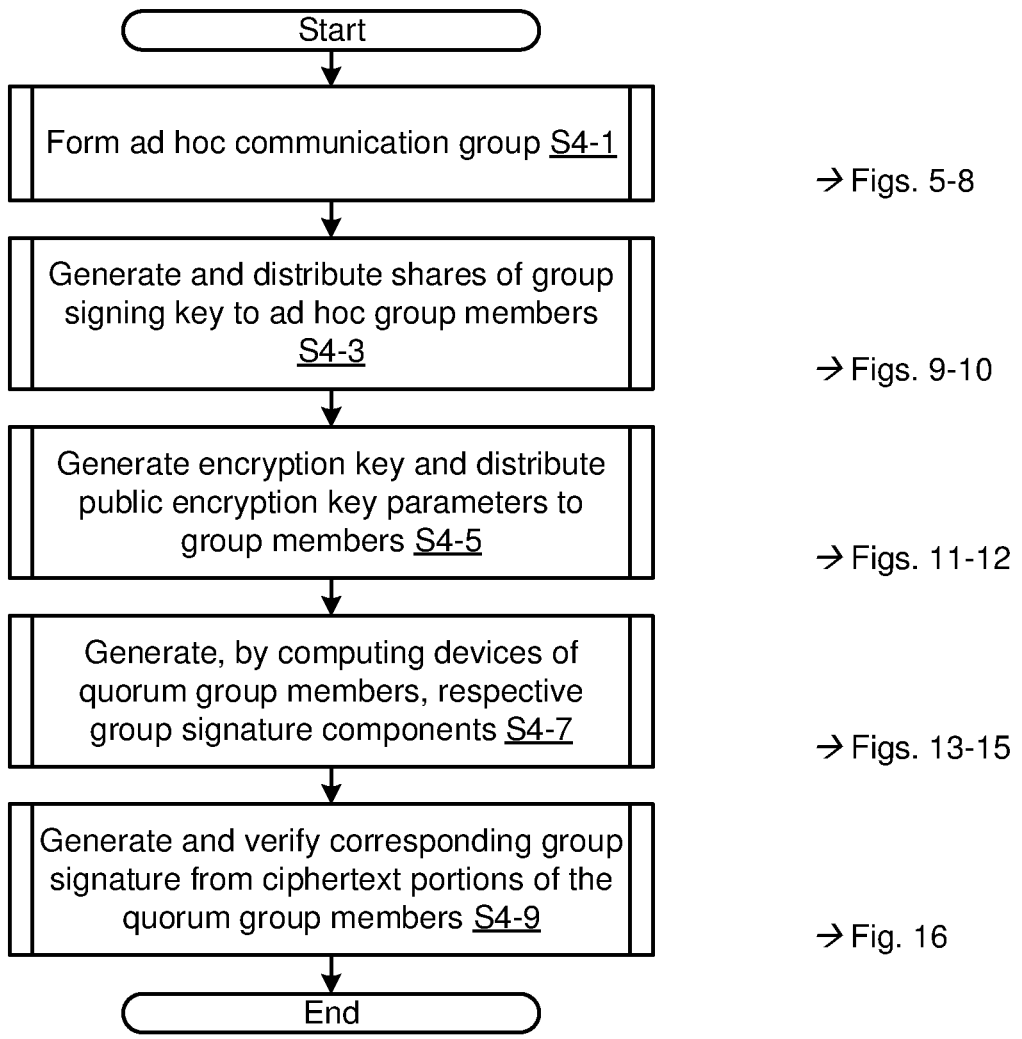
FIG. 4 is a flow diagram outlining the main exemplary processing steps performed by components of the system shown in FIG. 1, according to embodiments of the present invention.

A brief description has been given above of the components forming part of the data communication system 1 of an embodiment. A more detailed description of the operation of these components will now be given with reference to the flow diagram of FIG. 4, which outlines the main exemplary computer-implemented processes using components of the system 1. As shown in FIG. 4, the messaging server 5 forms an ad hoc communication group of verified users at step S4-1. At step S4-3, the messaging server 5 generates and distributes quorum shares of a group signing key to the ad hoc group members, to enable at least a minimum number of the group members to collectively digitally sign group output data, such as messages, documents or files which the group have originated or are responsible. Optionally, the messaging server 5 may generate at step S4-5 a group encryption key and distribute the public encryption parameter components to the group members, to provide additional security in the communication of data components of the group digital signature between the group members and the server. At step S4-7, computing devices 3 of the quorum of group members are used to generate respective group signature quorum portions 91, using the respective received shares of the group signing key received at step S4-3. The group signature quorum portions may be encrypted ciphertext portions, using the public group encryption key parameters received at step S4-5. At step S4-9, the messaging server 5 generates and verifies the corresponding group signature from the group signature quorum portions 91 of the quorum group members.

Figure 5:
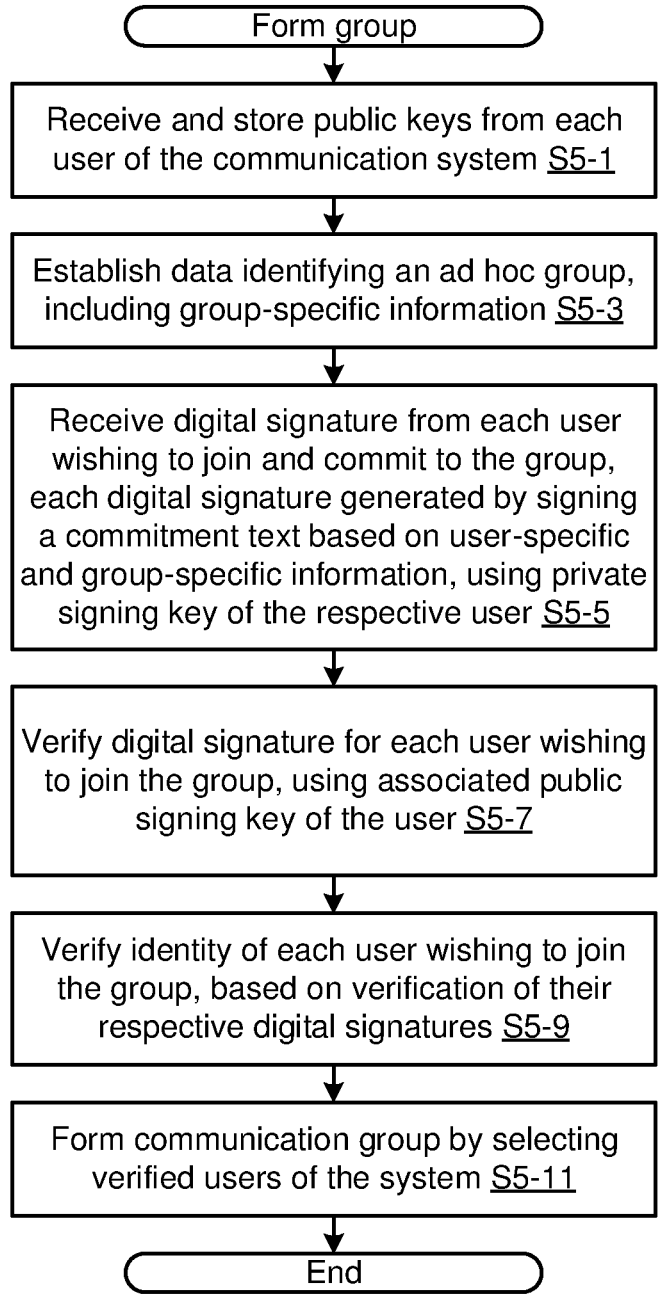
FIG. 5 is a flow diagram illustrating the process of forming an ad hoc communication group, according to an embodiment.
Figure 6:
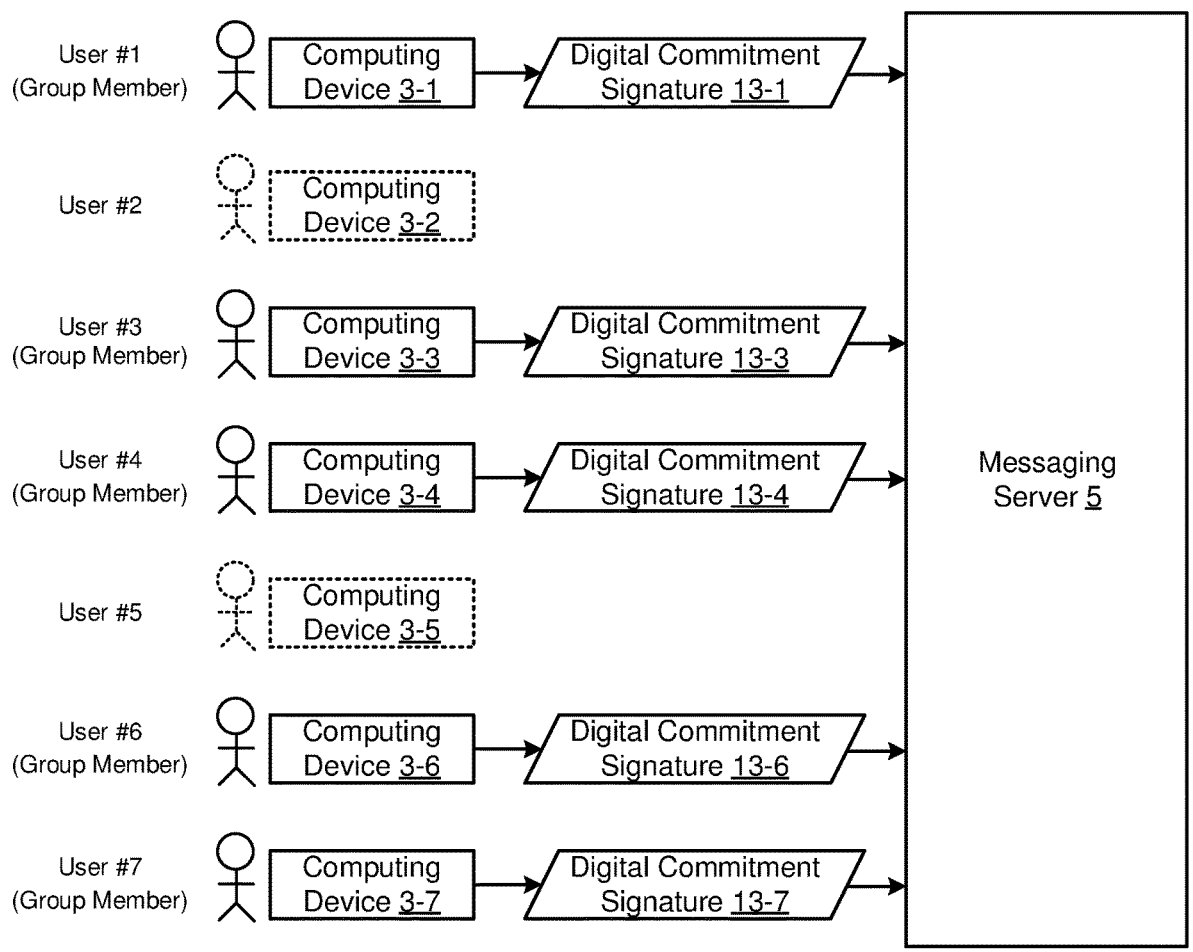
FIG. 6 is a block flow diagram schematically illustrating a worked example in which a group of users provide respective digital commitment signatures to the messaging server to commit to membership of an ad hoc group.

FIG. 5 is a flow diagram illustrating the process of forming an ad hoc communication group, according to an embodiment. Reference is also made to FIG. 6, schematically illustrating exemplary data and processing components of a worked example, in which a subset of five out of seven users of the system 1 provide respective digital commitment signatures 13 to the messaging server 5, to commit to membership of an ad hoc group 9a. As shown in FIG. 5, the messaging server 5 receives and stores public user signing keys 17a from the users in the system 1, at step S5-1. This step may be performed as part of a registration process between a new user and the messaging server 5, where a computing device 3 of the new user transmits the public user signing key 17a to the messaging server 5. Alternatively, the messaging server 5 may request and retrieve public user signing keys 17a from a third party server or provider, such as a certificate authority.

At step S5-3, the messaging server 5 may establish data 9b identifying an ad hoc group 9a, including group-specific information that may be used to uniquely identify the ad hoc group 9a. At step S5-5, the messaging server 5 receives a digital commitment signature 13 from each user wishing to commit to membership of the ad hoc group 9a. Each digital commitment signature 13 is generated by a computing device 3 of the user, by digitally signing a commitment text using the private signing key 17b of the respective user. The commitment text may be unique to the user and ad hoc group 9a, for example based on the group-specific information of the ad hoc group 9a and user-specific information that may be used to uniquely identify the user. At step S5-7, the messaging server 5 verifies the digital commitment signature 13 as received from each user wishing to join the ad hoc group 9a, based on associated complementary public signing key 17a of the user. At step S5-9, the messaging server 5 verifies the identity of each user wishing to join the group, based on a positive verification of the respective received digital commitment signature 13. At step S5-11, the messaging server 5 forms a communication group 9b by selecting the verified users of the system, in order to enable and facilitate the transmission of data between of the ad hoc group 9a members.

Figure 7:
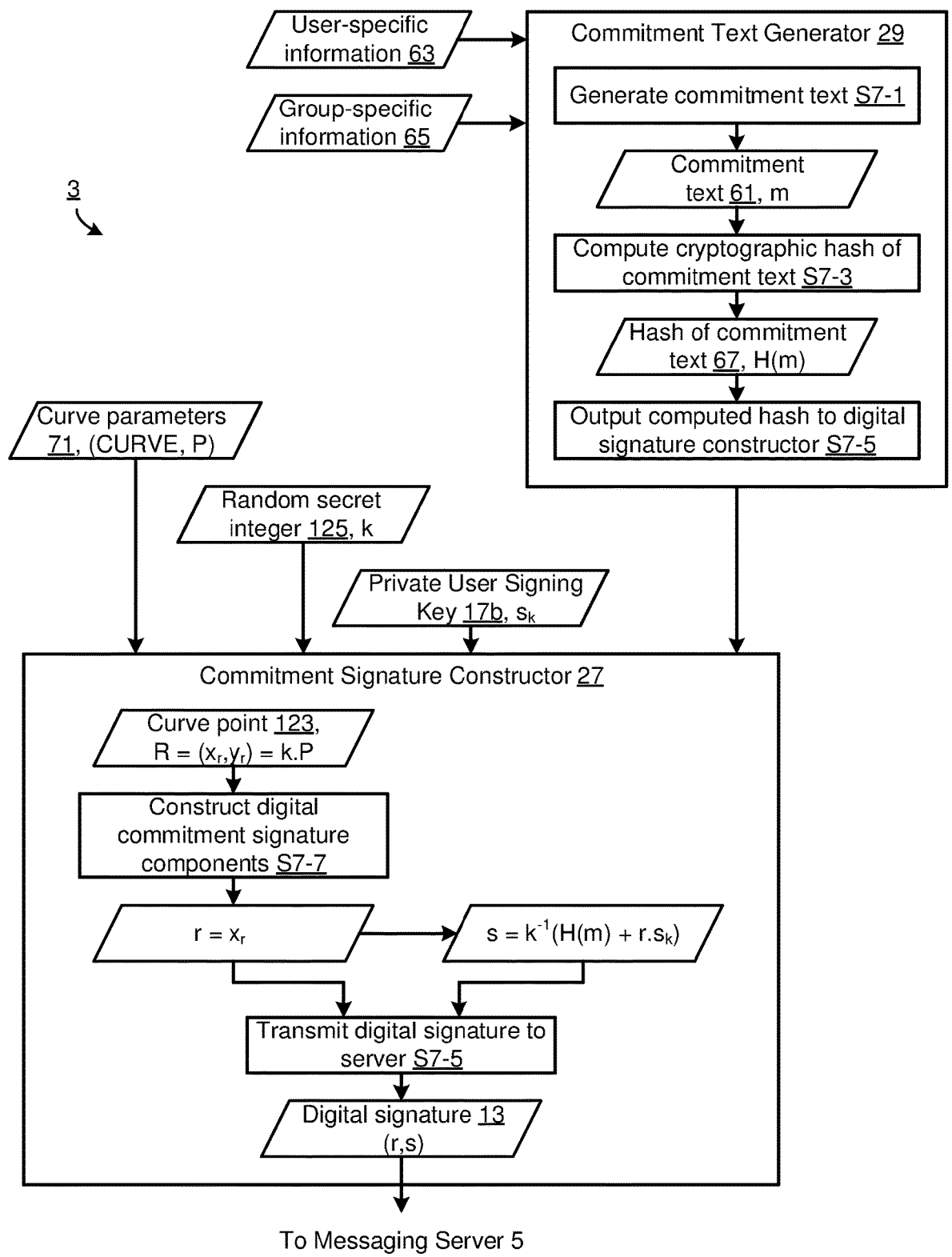
FIG. 7 is a block flow diagram illustrating the process of generating a digital commitment signature, according to an embodiment.

FIG. 7 is a block flow diagram illustrating main data elements and processing steps of a computing device 3 to generate a digital commitment signature as provided to the messaging server 5 in step S5-5, according to another exemplary embodiment. In this embodiment, the digital signature is based on the Elliptic Curve Digital Signature Algorithm (ECDSA) standard. It will be appreciated by the skilled practitioner that other digital signature methods may be employed in alternative embodiments, including algorithms that are not based on elliptic curves.

ECDSA is based on the (x, y) coordinate points of an elliptic curve defined by an elliptic curve equation such as $y^2=ax^3+b$ modulo p where a, b and p are constants. The curve parameters 71, including the defined curve equation, associated curve order and base point, may be stored in the messaging server 5 and securely communicated to the computing devices 3. In the following worked example, a 64-bit elliptic curve is defined by the equation $y^2=1317-3x^3$ modulo 18446744073709480063. It will be appreciated that the numbers used in the present worked examples are kept artificially small for simplicity and clarity. In practice, a 256-bit elliptic curve public key typically provides comparable security to a 3072-bit RSA public key. Each potential member of the group is in the possession of their own private signing keys 17b, typically unique numbers, which when used to scalar multiply the publicly known basepoint of the elliptic curve, produces points 123 on the curve. These curve points 123, defined by their x and y coordinates, are the users respective public signing keys 17a. Each potential member of the group 9a may typically also have a separate private key (not shown) for decrypting data that is encrypted using the complementary public encryption key. All public keys may be stored and/or made accessible to the group members for example in a central database in the memory 11 of the messaging server 5.

In the example shown in FIG. 6, an ad hoc group 9a is formed from individuals who each bind themselves to the ad hoc group 9a by means of their respective digital signature to a commitment text. As an example, the base point P is (4,18446744073709480026) and the private signing key 17b-1, $S_{kA}$, for Alice (user #1) is 5551051252373342629 and she proceeds to join the ad hoc group 9a. Alice's corresponding public key 17a-1 for signature verification, as stored in the database 11 on the messaging server 5, is $G_A = S_{kA} \cdot P = 5551051252373342629 \cdot (4, 18446744073709480026) = (8132836228540739752, 2881355029227062 49).$ Alice's private key for decrypting her messages $s_{keA}$ is 17791996306848417525 and her corresponding public key for encrypting messages to her, is also stored in the database is $G_{AE} = s_{keA} \cdot P = (16889114607446923828, 9069871558194079671)$ Another potential member of the ad hoc group, Bob (user #3) has the private signing key 17b-3 of 4093308345171682779 and Bob's corresponding public signature verification key 17a-3, as stored in the database 11 on the messaging server 5, is (28002963593992494 80, 10297627114585913676) because $4093308345171682779 \cdot (4, 18446744073709480026) = (28002963593992494 80, 10297627114585913676)$ Bob's private key for decrypting his messages $s_{keB}$ is 3039272482111618869 and his corresponding public key for encrypting messages to him, also stored on the admin server in the database is $G_{BE} = s_{keB} \cdot P = (17663116970953765892, 1810742705365437867)$ An ad hoc group 9a is to be formed from verified users of the system. For example, Alice and Bob may be members of an engineering company's employees for a project to construct an advanced compressor known as project_z3. This ad hoc group of users is constituted prior to formation of the communication group 9 by the messaging server 5. In one scenario, the users may specifically elect to join the group and initiate a process to commit to membership of the ad hoc group. In other scenarios, the users may be assigned to the ad hoc group and prompted to confirm and commit to group membership. Continuing this worked example, Alice irrefutably commits to the group by means of her digital signature 13 to a commitment text 61, m:

"Alice,employee #371288,project_z3,public encryption key(16889114607446923828, 9069871558194079671),date 8/29/2019".

Referring again to FIG. 7, the commitment text 61 is generated at step S7-1 by the commitment text generator 29 of the computing device, from user-specific components 63, such as the employee ID, and group-specific components 65, such as the project ID. Preferably, although not necessarily, the digital commitment signature 13 is generated from a hash 67 of the commitment text 61, computed for example by the cryptographic hash calculator 31 of the computing device 3 at step S7-3. The cryptographic hash calculator 31 may implement any form of cryptographic hash function, such as a SHA-based hash function. In the present worked example, after curtailing the hash output length to 64-bits, the SHA-3 hash 67 of the above commitment text 61 is $H(m) = 563061870284233103$ The computed hash value 67 is output to the digital signature constructor 27 at step S7-5, to generate the digital commitment signature 13, using the respective user's private signing key 17b. The elliptic curve based digital signature 13 in this worked example consists of two components integers r and s, expressed as (r, s), generated by the digital signature constructor 27 at step S7-7, where r is the x coordinate of a randomly selected point 123 on the curve, defined by R=k. P=$(x_r, y_r)$. Explicitly, r=$x_r$ and k is a random secret integer 125 less than the order of the curve, curveorder.

Having determined the first component r based on the user-specific random value 125, k, the other half of the digital signature s is given by $$S = \frac{H(m) + rs_k}{k}$$

modulo curveorder, where H(m) is the cryptographic hash 67 of the commitment text 61 m, and $s_k$ is Alice's secret private signing key 17b. The order of the elliptic curve in this example is the prime integer 18446744076907029473. Preferably, a different, random k should be generated for each respective user's digital commitment signature to avoid the possibility of fraudulent derivation of an individual private signing key $s_k$. Each user-specific random value 125, k, is securely generated by the computing device 3 and is kept secret from all other devices 3 and the messaging server 5, to avoid the private key $s_k$ from being learnt for example from malicious eavesdropping of the other public parameters as transmitted between components in the system 1.

Returning to step S7-7 and the present worked example, Alice constructs her digital commitment signature 13, by first selecting k randomly, generated for example by the random number generator 43 of the computing device 3

$k = 11272821019261195146$ and calculating the random point 123 on the curve P as $R = k \cdot P = (12040502102118179134, 5549625494515165643)$ making the first component of the digital commitment signature 13

$r = 12040502102118179134$

Next, the multiplicative inverse of k, modulo curveorder, is calculated using the equality $k^{-1} = k^{curveorder-2}$ modulo curveorder, providing curveorder is prime. The result in this worked example is $k^{-1} = 4156072149833332983$ Calculating s produces the second component of the digital commitment signature 13

$$s=k^{-1}(H(m)+r \cdot s_{kA})=6347665258214350586$$

Consequently, Alice's digital signature 13 to her specific commitment text to the group is (12040502102118179134,6347665258214350586)

Figure 8:
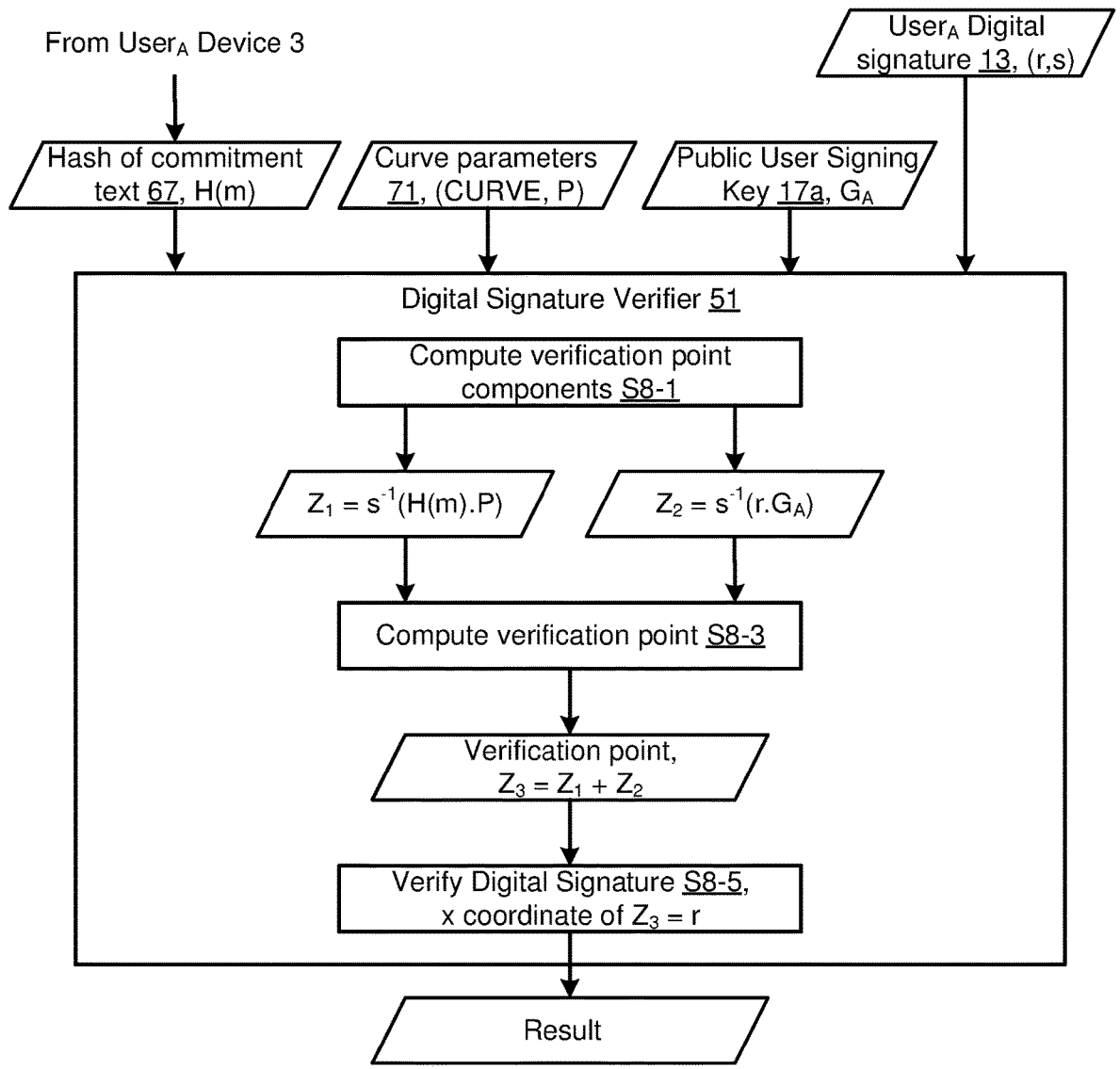
FIG. 8 is a block flow diagram illustrating the process of verifying a digital commitment signature, according to an embodiment.

The commitment digital signatures 13 are stored on the messaging server 5 along with the corresponding user and group specific commitment text. In this way, anyone with access to the messaging server 5 is able to verify that Alice is bound to the project_z3 ad hoc group by checking Alice's digital signature to her commitment text. Verification of her digital commitment signature is carried out by using her public signing key 17a, as stored in the messaging server 5. The verification process is described with reference to the exemplary flow diagram of FIG. 8.

For signature verification, a first point $Z_1$ is calculated at step S8-1 based on the hash of the associated commitment text. For example, the cryptographic hash calculator 31 of the messaging server 5 may be used to calculate the SHA-3 hash of Alice's commitment text 61. Following from the above worked example, the first calculated point is $$Z_1=s^{-1}H(m) \cdot P=(6036458696185698209, 4807218848711965654)$$

Secondly, using Alice's public signing key 17a, $G_A$, a second point $Z_2$ is calculated as $$Z_2=s^{-1}r \cdot G_A=(3248071221421009023, 12909990403934400347)$$

The verification point $Z_3$ is calculated from the sum of the first and second points $$Z_3=Z_1+Z_2=(12040502102118179134, 5549625494515165643)$$

At step S8-5, the digital signature verifier 51 determines whether the received digital commitment signature 13 is valid. In the present worked example, Alice's digital signature is verified when the x coordinate of $Z_3$ is equal to the portion of the digital signature, r, which is true as evident in this example. In similar fashion, Bob commits to the group by digitally signing his commitment text "Bob,employee #371364,project_z3,public encryption key(17663116970953765892, 1810742705365437867),date 8/31/2019".

His signature is (10108474255140621900,853161860928269063), which may be verified by anyone with access to the admin server database by using his signature public key in the same procedure as described above for Alice. Similarly, the commitment texts of other members of the ad hoc group for project_z3 may be checked by verifying their respective digital commitment signatures 13. A positive or negative result of the verification may be output by the digital signature verifier 51, for example to the computing device 3 requesting verification of the digital commitment signature 13.

Figure 9A:
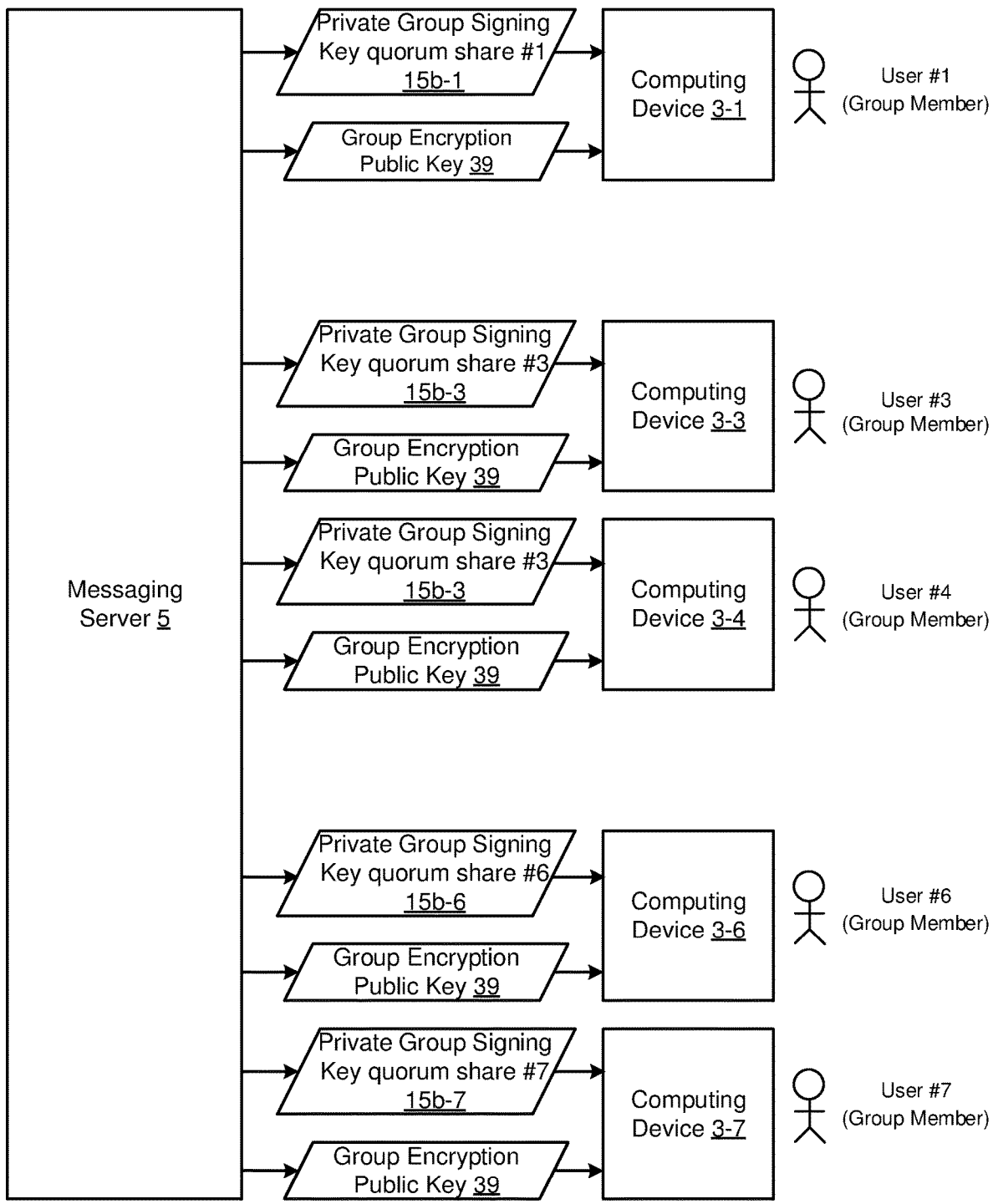
FIGS. 9A and 9B, is a block flow diagram schematically illustrating a worked example in which computing devices of the group members are used to collectively sign a group data output, using respective group signing key quorum shares.
Figure 9B:
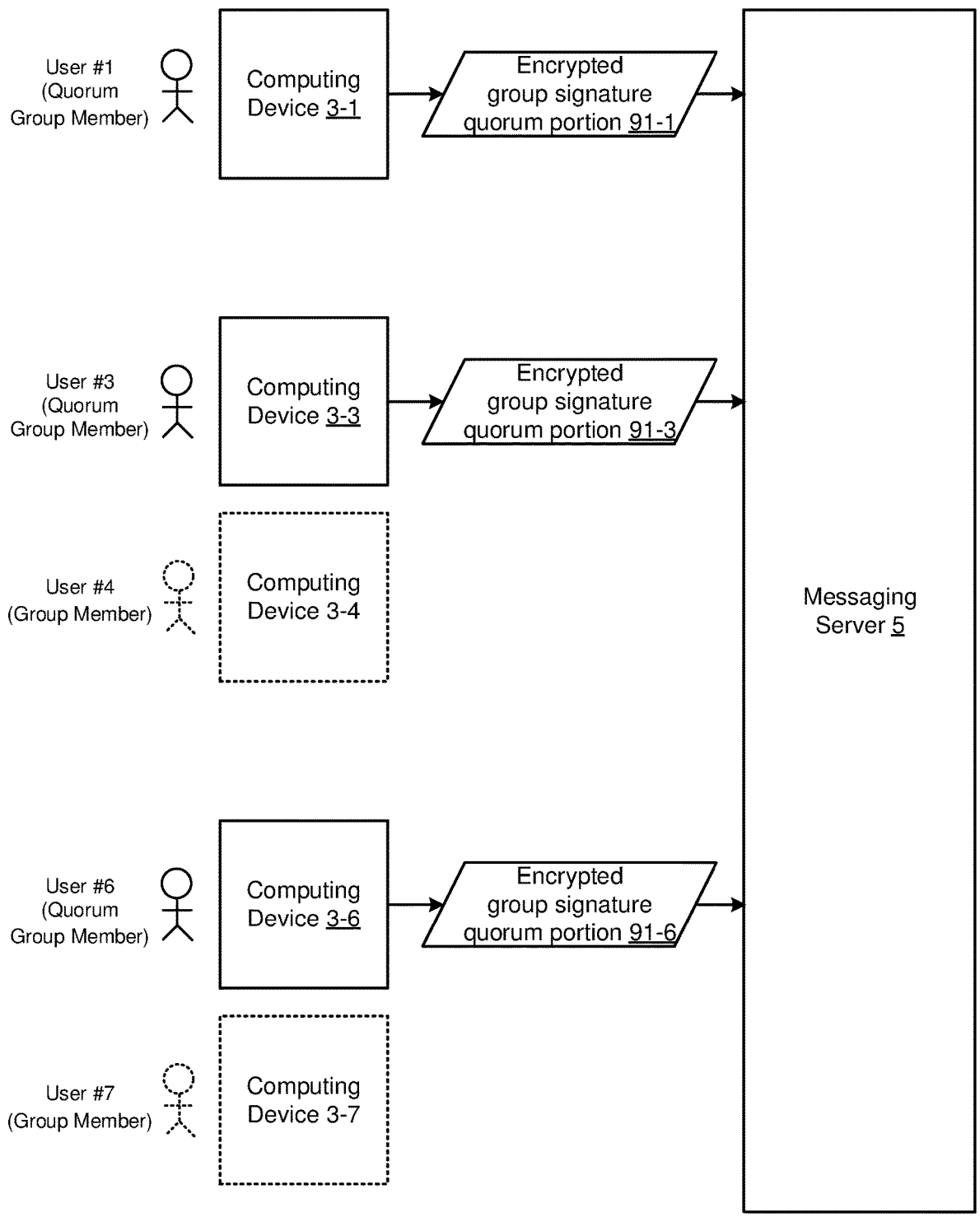

FIGS. 9A and 9B are block diagrams schematically illustrating an exemplary worked example for the embodiment in which computing devices 3 of the group members are used to collectively sign a group data output, using respective group signing key quorum shares 15b provided by the messaging server 5. Following from the previous worked example, a minimum of three of the five members from the ad hoc group form the quorum required to produce a group signature. The quorum group members carry out mathematical operations on ciphertext components of the group digital signature, to produce an encryption of the group digital signature without revealing any secrets to each other. The individual ciphertext components alone, nor in combination, do not reveal any information that would enable any one individual to fraudulently generate and present a digital signature as a group digital signature, unless that individual was in possession of each one of the secret k-component values 125 of the group members, or the corresponding private group signing key.

As shown in FIG. 9A, each member of the ad hoc group 9 is given a secret share of a private group signing key 15b by the messaging server 5. Advantageously, this enables data outputs of the group to be digitally signed by a quorum formed from members of the ad hoc group 9a. The digitally signing is carried out in a threshold manner so that at least a minimum number of members of the ad hoc group have to cooperate together to produce the group digital signature 121. The minimum number of group members for a quorum may be predefined by the parameters of the secret sharing algorithm implemented in the system 1, as will be described in greater detail below. In this embodiment, the messaging server 5 also provides a public group encryption key 39 to each computing device 3 in the group 9, for the generation of respective one or more encrypted group signature components 91. The set of signed group signature components 91 may be transmitted by the quorum of computing devices 3 in the group 9 to the messaging server 5 for subsequent verification. The public group signing key 15a for verification of group digital signatures may be made available to anyone with access to the database 11 of the messaging server 5.

Figure 10:
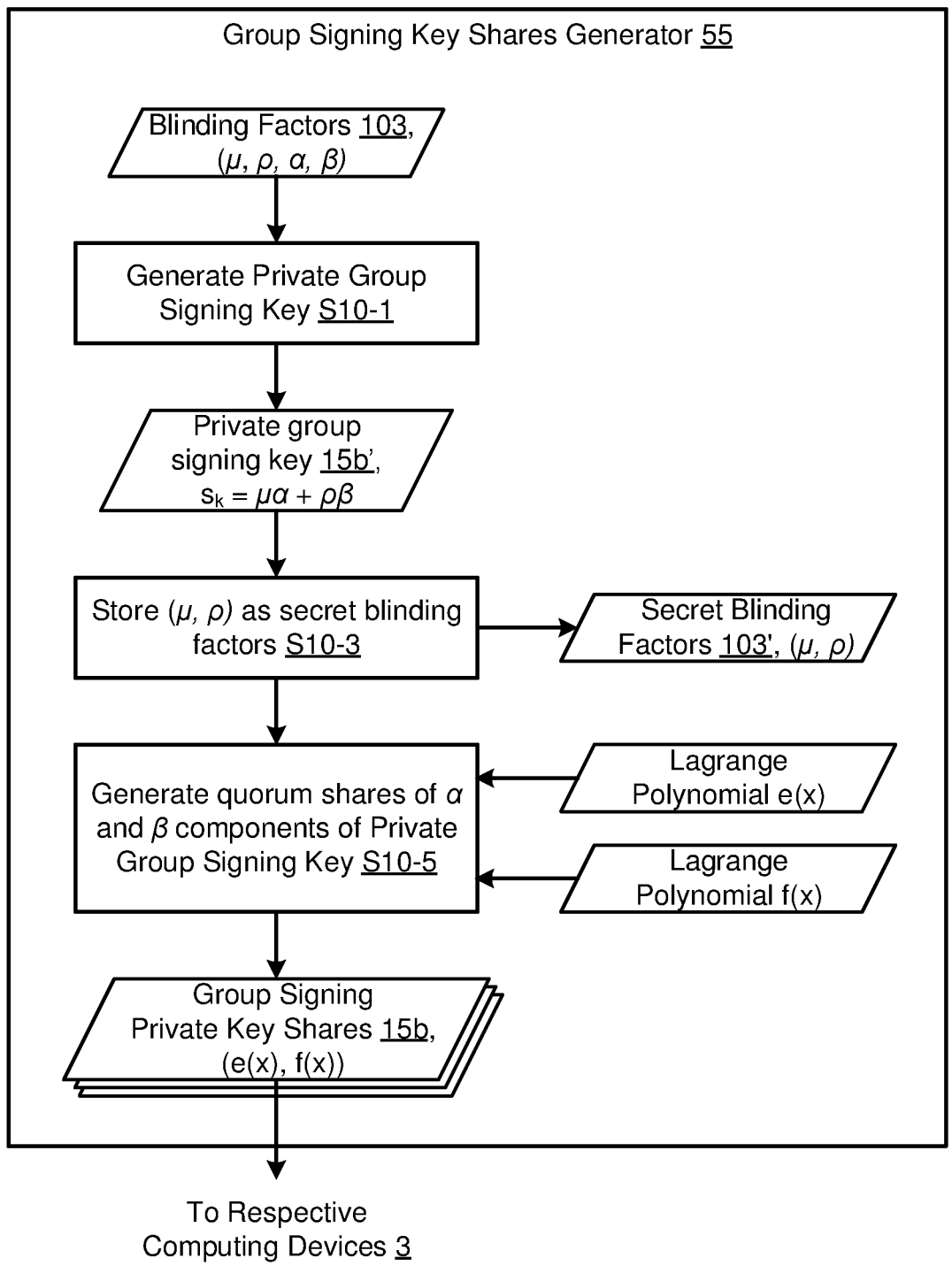
FIG. 10 is a block flow diagram illustrating the process of generating quorum fragments or shares of a group signing key, according to an embodiment.

FIG. 10 is a block flow diagram illustrating main data elements and processing steps of the group signing key shares generator 55 of the messaging server 5, to generate quorum fragments or shares of a group signing key as provided to the computing devices 5 of the communication group. In the present worked example, the private group signing key 15b', $s_k$, is represented as $$s_k=\mu\alpha+\rho\beta \text{ modulo curveorder}$$

where β, ρ and β are randomly chosen blinding factors 103. The blinding factors 103 are introduced to increase security and may be generated by the random number generator 43.

In this exemplary embodiment, the values of blinding factors 103α and β are secret shared by the messaging server 5 as the respective components of the private group signing key shares 15b. The group signing key shares generator 55 implements secret sharing of α and β using two respective Lagrange polynomials e(x) and f(x), evaluated across respective indices for the group members, such as x=1, x=2, x=3 through to x=5. It is appreciated that other indices of x may be used instead of these examples, provided they are all distinct and less than curveorder.

As known in the art, each Lagrange polynomial is generally defined as $$S+d_1x+d_2x^2+\ldots x_{k-1}x^{k-1}$$

where S is a secret value and the coefficients $d_1$, $d_2$, $d_3$, $d_4 \ldots d_{k-1}$ are randomly chosen for each polynomial. Each group member, which can also be referred to as a key fragment holder, is assigned a unique index, x, and subsequently sent corresponding a secret data share consisting of the polynomial value that results when x is set equal to their group member index. In this embodiment, α is used as the secret value for e(x), and β is used as the secret value for f(x). The polynomial values are evaluated modulo curveorder.

Continuing with the worked example, a set of blinding factors 103 is randomly determined, for example using the random number generator 43, as:

μ=17251044702788393392

ρ=12770288373079121381 with α=9795320568791577787

β=12895147443676151627 and coefficients of the corresponding Lagrange polynomials randomly determined to define:

e(x)=9795320568791577787+89782665774613959x+14539686252152285917x² f(x)=12895147443676151627+5190632838316678182x+9321056015604563421x²

It will be noticed that e(0)=α and f (0)=β.

Consequently, the group signing key shares generator 55 of the messaging server 5 generates, at step S10-1, a private key 15b' used for signing by the ad hoc group with the value $s_k$=5551051252373342629.

The blinding factors μ and ρ are stored as the secret blinding factors 103' associated with the communication group 9, at step S10-3, for example in the memory 11 of the messaging server 5. At step S10-5, the group signing key shares generator 55 generates quorum shares of the α and β factors, using the respective Lagrange polynomials e(x) and f(x). The private signing key shares 15b issued to the five ad hoc group members in the present worked example are:

e(1)=25324789486718477663 and
  f(1)=27406836297597393230 e(2)=69933630908949949373 and
  f(2)=60560637182727761675 e(3)=143621844835485992917 and
  f(3)=112356550099067256962 30 e(4)=246389431266326608295 and
  f(4)=182794575046615879091 e(5)=378236390201471795507 and
  f(5)=378236390201471795507

Advantageously, the private group signing key 15b' and the associated shares 15b are deleted from the messaging server 5 for improved security, once the encrypted shares 15b have been distributed to the ad hoc group members.

Figure 11:
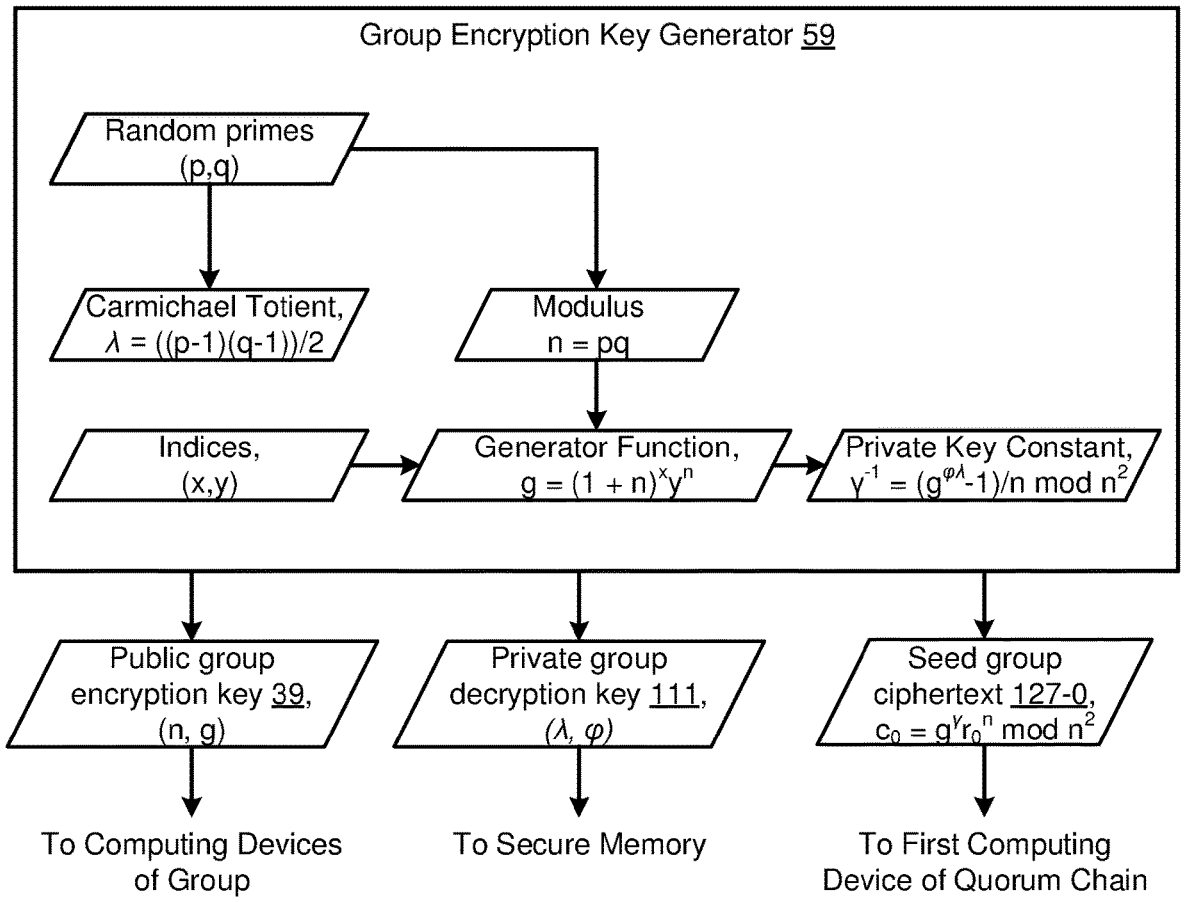
FIG. 11 is a block flow diagram illustrating the process of generating a group encryption key, according to an embodiment.

FIG. 11 is a block flow diagram illustrating main data elements and processing steps of the group encryption key generator 59 of the messaging server 5, to generate a group encryption key as provided to the computing devices 5 of the communication group, according to embodiments involving group-based encryption. In the present embodiment, the group encryption key is based on a homomorphic encryption scheme that is adapted to configure and enable each device 5 to produce respective malleable encrypted portions of a group digital signature 121. Malleability of the resulting encrypted portions allows the encrypted portions of the group encryption key to be combined while in encrypted form, and the resulting combined ciphertext to be decrypted to produce the combined group signature in plain text. The present embodiment thereby advantageously enables members of the ad hoc group 9 to interact in a confidential manner without revealing group signing secrets to each other. The quorum of ad hoc group members is configured to collectively produce an encrypted group digital signature 121 to outputs of the group, which is subsequently decrypted by the messaging server 5, or a dedicated decryption group to produce the ad hoc group's digital signature.

An exemplary worked implementation will be described for a group encryption key based on the Paillier public key encryption scheme. Those skilled in the art will appreciate that other homomorphic encryption schemes may be suitable, such as partially homomorphic encryption schemes including unpadded RSA, ElGamal, Goldwasser-Micali, Benaloh, and the like, and fully homomorphic encryption (FHE) schemes. As is known, the conventional Paillier public key system is an extension of the composite modulus idea behind RSA. A composite number n is constructed from the product of two large primes p and q which are kept secret. Preferably, although not necessarily, the secret primes are safe primes, meaning they have an order that is two times another prime number, and are of the same length in bits. With safe primes, the order λ of any positive integer, less than n and relatively prime to n, is given by λ=

$$\frac{(p-1)(q-1)}{2}.$$

A generator g with some minor constraints is selected randomly from the non-zero integers less than n, where a message m<n may be encrypted into a ciphertext $c_m$ by evaluating the equation $c_m = g^m r_a^n$ modulo $n^2$ where $r_a$ is a random, non-zero integer<$n^2$. The composite number n is constructed by the group encryption key generator 59 of the messaging server 5, or may be constructed in a distributed manner. In this worked example, the generator g for Paillier encryption is constructed as $g=(1+n)^x y^n$ where x and y are each randomly chosen, non-zero integers less than n.

In the present worked example, two random 190 bit primes are chosen for p and q. These primes are this large in order to accommodate combining points from the 64 bit elliptic curve without the values overflowing due to modulo n Paillier decryption.

p=1569275433846670190958947355801916604025588861116008619147 q=1176956575385002643219210516851437453019191510899520158867

The modulus n=pq is computed to be

1846969040455991213075580004694231897113112566548985426961569113665116510609799192784748027249743513982050738026449 and n² is:

3411294636402924906333206883828740966140617907747210364474260222472196337069114414694662110070618015536494272636692880688489662594082388687796270722127040237243158561284070316980767018338832594818225614605772408967163939423549601

As p and q are safe primes, the order, Carmichael's totient function, of any integer relatively prime to n is given by $$\lambda = \frac{(p-1)(q-1)}{2}$$

In the present worked example, $\lambda$ is computed to be:

9234845202279956065377900023471159485565562832744927134
7941144082794241888781
0517456047336596349366805017604624218

In the present exemplary embodiment, the corresponding private group decryption key 111 is retained by the messaging server 5 and kept secret. As will be described below, the private group decryption key 111 is used by the messaging server 5 to produce a decrypted group digital signature 153 from encrypted group signature quorum portions 91 provided by the ad hoc group members.

In this exemplary embodiment, the group encryption key generator 59 also generates a seed ciphertext portion 127-0, denoted as $c_0$, which may be distributed to the ad hoc group members in order to configure the computing devices with a quorum signing key components 127 to construct respective encrypted group signature quorum portions 91, as will be described below. The messaging server 5 may be configured to distribute the seed ciphertext portion 127-0 to each ad hoc group member along with their respective private signing key share 15b, for example during set up following formation of the ad hoc group. Alternatively, the seed ciphertext portion 127-0 may be transmitted to a first computing device 3 of a determined chain of quorum users of the ad hoc group, for example to initiate the generation of the quorum signature component 127 by the quorum.

In the present worked example, a private key constant term y is encrypted into the seed ciphertext portion 127-0 where $$c_0 = g^y r_0^n \text{ modulo } n^2$$

By starting with this seed ciphertext, this factor is built in within the ciphertext that is the encryption of the group digital signature s. In this way, it is not necessary to divide by the term $$\gamma^{-1} = \frac{g^{\varphi\lambda} - 1}{n}$$

mod $n^2$, as would otherwise be needed in conventional Paillier decryption, because this factor is already included. Instead, decryption is simply $$s = \frac{c^{\varphi\lambda} - 1}{n}$$

mod n. Advantageously, this implementation does not expose knowledge of the blinded secret private key $\varphi\lambda$.

Continuing the worked example, the private key constant is computed as:

y=153783108819514950799190784380898856153166008882400912551193870805311432974783700708094513114809407711120132021321 with the resulting seed ciphertext portion 127-0:

$c_0$=125841608659986013658654119405522332074279105062969349084347471438387580697574137888980561641197611504026784524590514514672891082167199994753500030891094746007035418082194927142435092405767113332913382956372076671489563584

Figure 12:
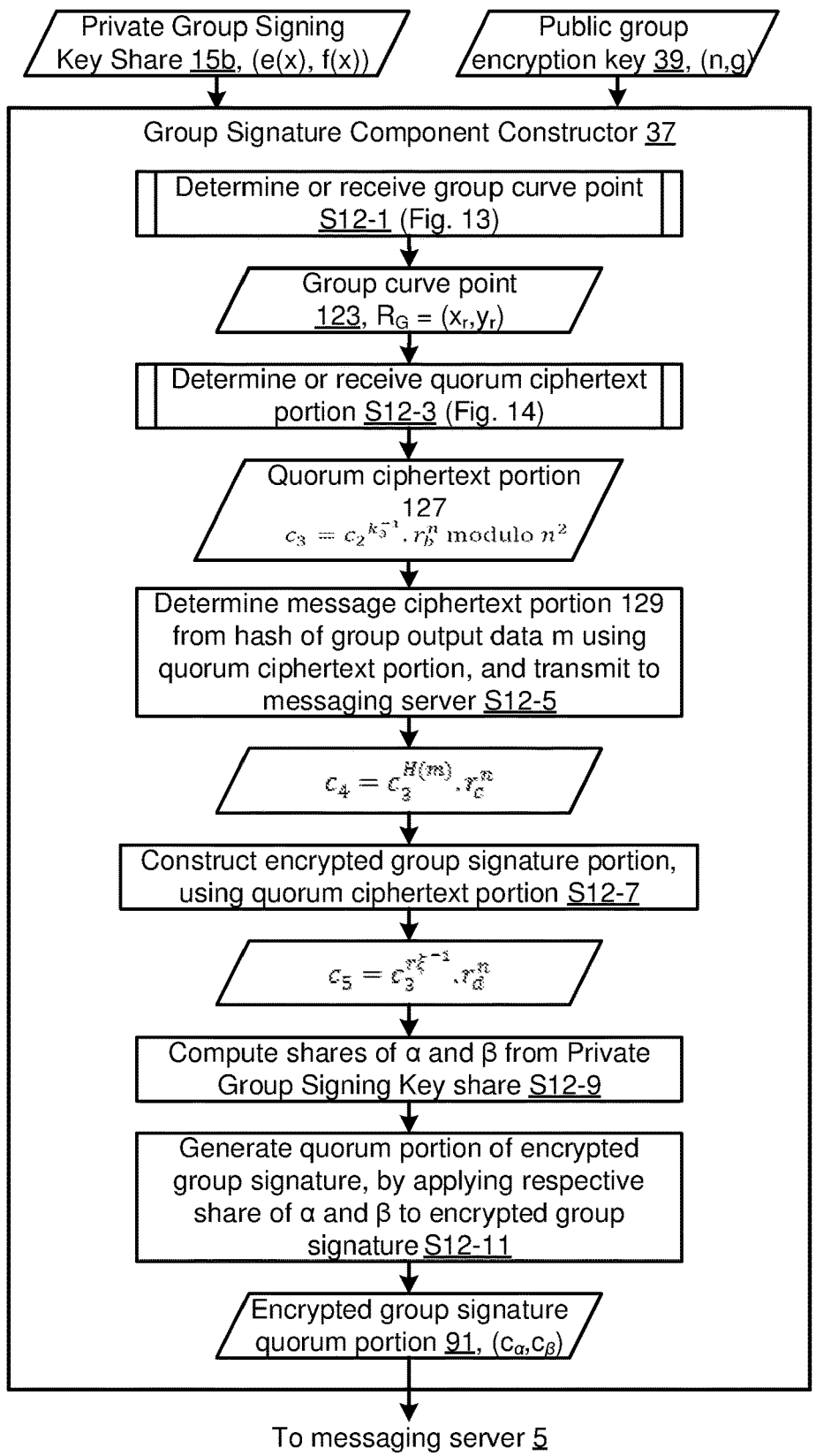
FIG. 12 is a block flow diagram illustrating the process of generating an encrypted group signature quorum portion, according to an embodiment.

FIG. 12 is a block flow diagram illustrating main data elements and processing steps of the group signature component constructor 37 of a computing device 3, to generate a respective quorum portion 91 of the group digital signature 121, according to an embodiment. In this exemplary embodiment, the components (r, s) of the group digital signature 121 are defined by $$S = \frac{H(m) + rs_k}{k} \text{ modulo } curveorder$$

where the variable k is chosen randomly, with r being the value of the x coordinate at a group curve point 123, denoted as $R = kP = (r, y_r)$.

The computing devices 3 of the quorum members of the ad hoc group are each configured to independently generate a respective random component 125 of the secret variable k, whereby the value of k is not known to any single processing component in the system. Following from the above worked example, the three quorum members generate respective components 125 of k denoted as $k_1$, $k_2$, and $k_3$. In this exemplary embodiment, the individual components 125 of k are multiplicatively combined to form k, so that $k = \Pi k_i$ since $k^{-1} = \Pi k_i^{-1}$. Advantageously, this allows for secrecy of the value of k, compared to computation of $k_1$, $k_2$, and $k_3$ components as additive components where the person calculating $k^{-1}$ will need to sum the components first and will therefore gain knowledge of the value of k.

To further improve computational efficiencies, each computing device 3 may be configured to generate the k components 125 randomly as inverses with a ceiling on their magnitudes, or to use a larger n such that the combined products do not exceed n. In the present worked example, the inverses $k_1^{-1}$, $k_2^{-1}$, $k_3^{-1}$ may be generated randomly by the computing devices 3 of the group members. Advantageously, this allows the components 125 to be multiplied modulo curveorder even though the inverses are encrypted as Paillier ciphertexts, which operate modulo $n^2$.

Figure 13:
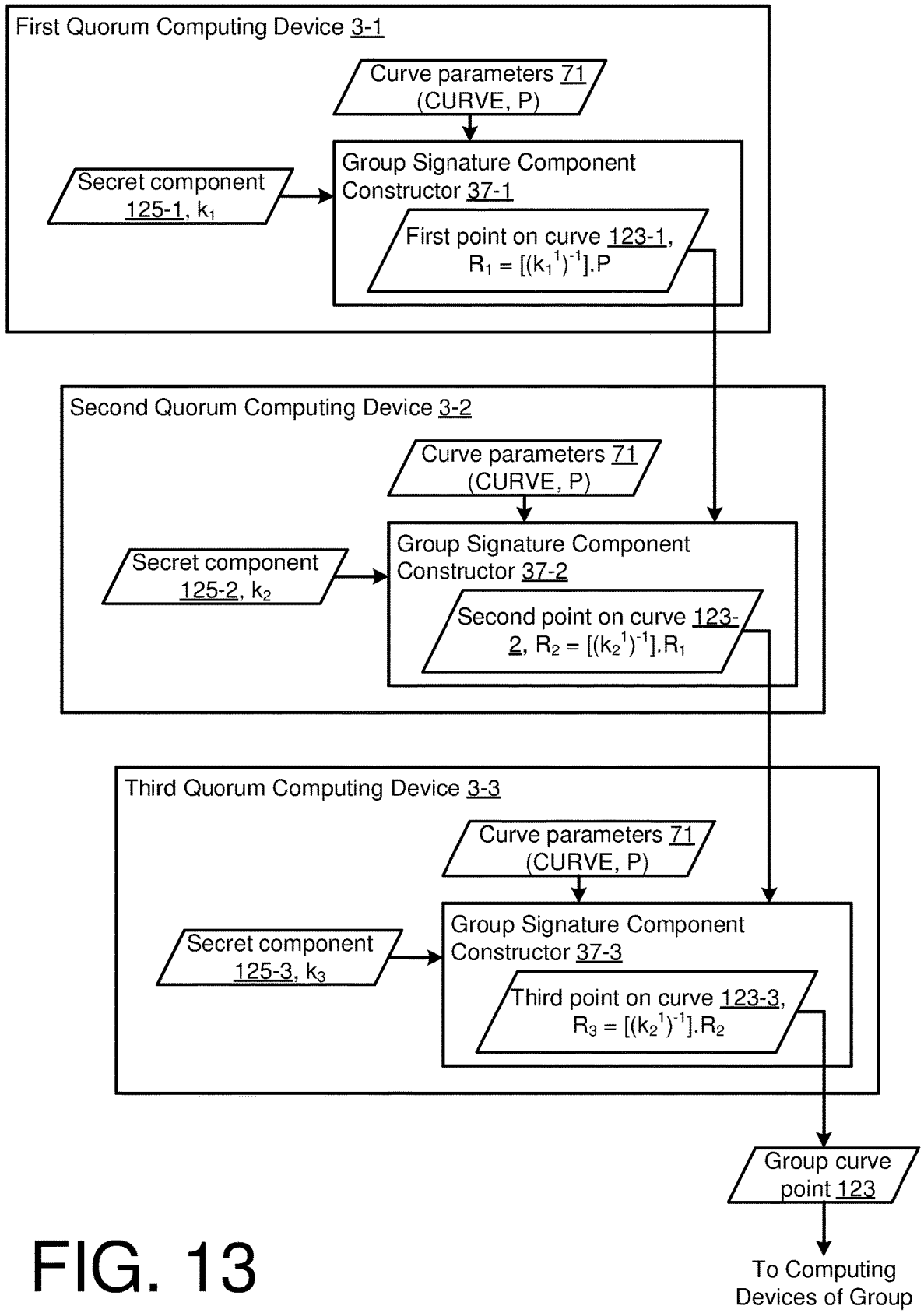
FIG. 13 is a block flow diagram illustrating the process of determining a group curve point.

The group signature component constructor 37 determines or receives the group curve point 123 at step S12-1, which is described in further detail with reference to the block flow diagram of FIG. 13. As shown, the group curve point 123, R, is determined in a chained calculation. The computing device 3-1 of the first quorum group member is used to generate a first point on the curve 123-1, based on the corresponding secret k-component inverse 125-1 and the curve parameters 71 as securely received from the messaging server 5:

$R_1 = [(k_1^{-1})^{-1} \text{ mod } curveorder]P$.

The computing device 3-2 of the second quorum group member is then used to generate a second point on the curve 123-2 based on the corresponding secret k-component inverse 125-2 and the first point $R_1$ received from the first quorum group member:

$R_2 = [(k_2^{-1})^{-1} \text{ mod } curveorder]R_1$.

Finally the third quorum group member generates a third point on the curve 123-3 based on the corresponding secret k-component inverse 125-1 and the second point R2 received from the second quorum group member. As the third quorum group member is the final quorum member in the chain, the third point is the final group curve point 123:

$R = [(k_3^{-1})^{-1} \text{ mod } curveorder]R_2$

It will be appreciated that the group curve point 123 includes the secret value k without exposing k itself, nor the constituent secret components 125:

$R = (k_1^{-1})^{-1}(k_2^{-1})^{-1}(k_3^{-1})^{-1}P = k_1 k_2 k_3 P = kP$

As an example:

$k_1^{-1}$=40933083451716827779 and
$(k_1^{-1})^{-1} = k_1$=10965855128813296547

$k_2^{-2}$=17791996306848417525 and
$(k_2^{-1})^{-1}$=$k_2$=665931737076718194

$k_3^{-1}$=30392724821116188869 and
$(k_3^{-1})^{-1}$=$k_3$=17818824404140658250

The net result in this example is $$k = \prod_{i=1}^{3} k_i = 1801876727575181666$$

Accordingly, it is found that:

$R_1$=$k_1P$=(16620521030262472561,
8962921558646211659)

$R_2$=$k_2P$=(34990293132068835580,
4865508555056541581)

and $R$=$k_3P$(15553370213277924246,
1560477998785825796)

R may be verified by checking that $R$=$kP$=(15553370213277924246,
1560477998785825796)

is the same point as the point calculated by the fragment holders, advantageously without any of the fragment holders being able to learn k. So, in this example $r$=$x_r$=15553370213277924246.

Figure 14:
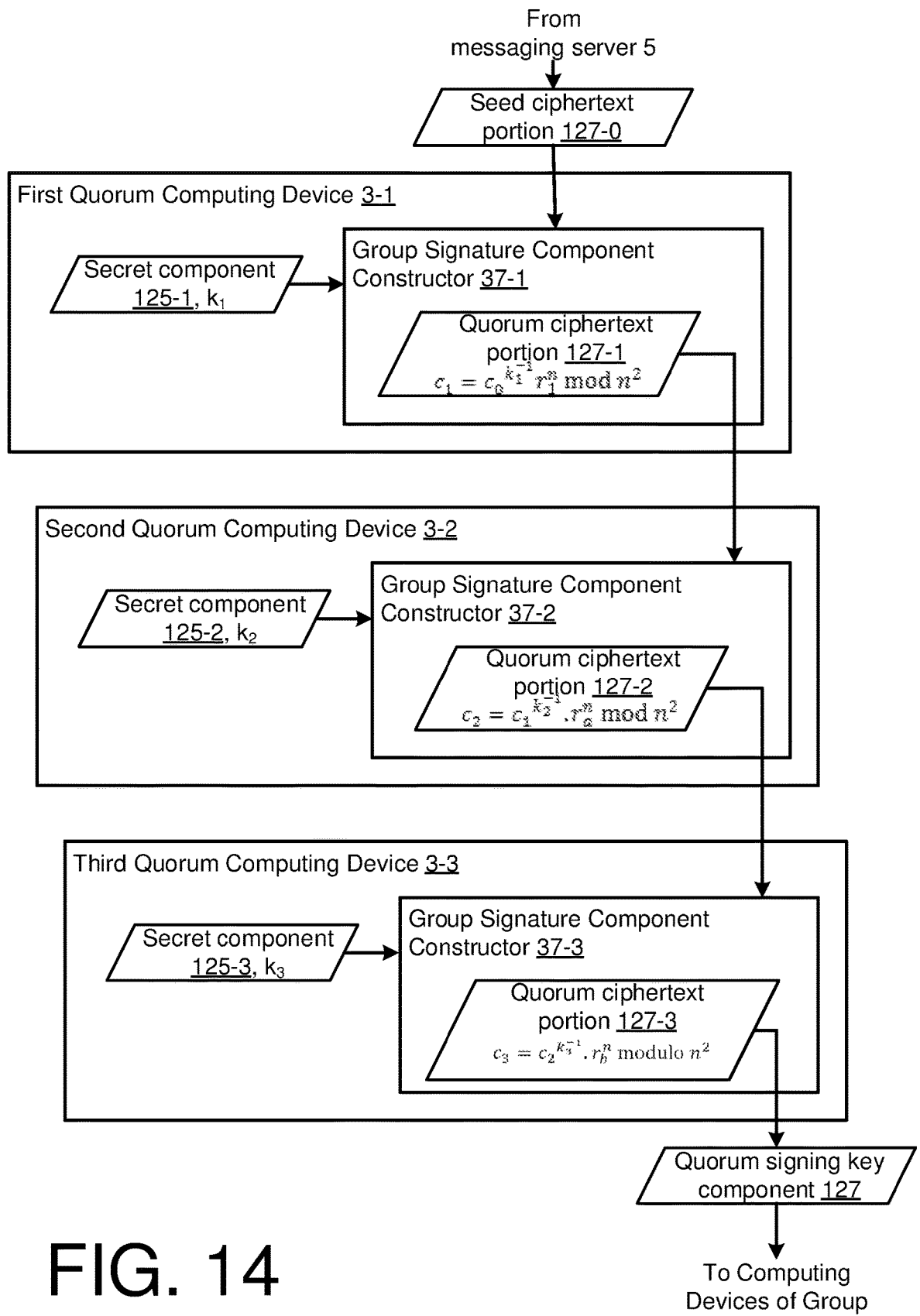
FIG. 14 is a block flow diagram illustrating the process of group encryption of a quorum ciphertext portion.

Referring back to FIG. 12, the group signature component constructor 37 determines or receives a quorum ciphertext portion 127 at step S12-3. This process involves group encryption of the seed ciphertext portion 127-0, by participating computing devices 3 of a quorum of group members, which is described in further detail with reference to the block flow diagram of FIG. 14. As shown, the quorum ciphertext portion 127, $c_3$ in the present worked example, is determined in a chained calculation whereby group encryption of $k^{-1}$ is effectively carried out by the three quorum group members, without exposing knowledge of k to any of the members. The computing device 3-1 of the first quorum group member uses the received seed ciphertext portion 127-0, $c_0$, to encrypt that user's corresponding secret k-component, $k_1^{-1}$, and produces the first quorum ciphertext portion 127-1, denoted as $c_1$:

$$c_1 = c_0^{k_1^{-1}} r_1^n \text{ modulo } n^2$$

where $r_1$ is a non-zero random number less than $n^2$.

The second quorum group member produces a second quorum ciphertext portion 127-2, $c_2$, from the ciphertext portion $c_1$ received from the first quorum computing device 3-1, and the respective user's corresponding secret k-component, $k_2^{-1}$:

$$c_2 = c_1^{k_2^{-1}} \cdot r_a^n \text{ modulo } n^2 = g^{k_1^{-1}k_2^{-1}} \text{ if modulo } n^2$$

The third quorum group member produces a third quorum ciphertext portion 127-3, $c_3$, from the ciphertext $c_2$ received from the second quorum computing device 3-2, and the respective user's corresponding secret k-component, $k_3^{-1}$:

$$c_3 = c_2^{k_3^{-1}} \cdot r_b^n \text{ modulo } n^2 = g^{k_1^{-1}k_2^{-1}k_3^{-1}} \cdot r_3$$
$$\text{modulo } n^2 = g^{k^{-1}} \cdot r_3^n \text{ modulo } n^2$$

As the third quorum group member is the final quorum member in the chain, the third quorum ciphertext portion 127-3, $c_3$, is the quorum ciphertext portion 127 as encrypted by the quorum group containing all of the secret k-components. A copy of the quorum ciphertext portion 127, $c_3$, is transmitted to each of the other computing devices 3 in the quorum.

In the present worked example:

$c_1$=42445553585468109232031962121718683839928179345589301066929229140925504213990
330775622059285403309898781895167415178603419793821
5909204523681114239225876960553155687344119855687503953111831172429437047577362749933025494631619444

$c_2$=25134898861743836352782524799582429806085395628908564921185795952896825675438
32565791376637123120083487020200787283671146801707639011132619254255853485985
1080310003087681976523844858622479367801248863650733019505061898802235609628 and $c_3$=531731499906387827035760860091049776135185371528437503340065132955755577919347123594219709623616048435919867716311307268787881705220747908117811298228634682402552918213933001738751135759318613812829911504074135428875082021628939

Referring back to FIG. 12, the next step is to incorporate the hash of a group output m, that is to be signed, H(m). As mentioned above, the group output data group output data may be messages, documents and/or files which the group have originated or are responsible. Having received the final quorum ciphertext portion 127, $c_3$, any one of the fragment holders may use their computing device 3 to generate a message ciphertext portion 129, denoted as $c_4$, from the hash of the group data:

$$c_4 = c_3^{H(m)} \cdot r_c^n = g^{k_1^{-1}k_2^{-1}k_3^{-1}}{}_{H(m)} \cdot r_4^n \text{ modulo } n^2$$

The message ciphertext portion 129 is transmitted by the computing device 3 to the messaging server 5. In this worked example, $c_4$=822794430736916995123202461576376377972432582340331875013129774219243735061026938277037598843298425050118173550763481819498130584604704347635604856170445511649538334548710468376434242255609255139157548604829560997879658532278267.

In the present exemplary embodiment, each quorum ad hoc member uses their computing device 3 to generate and send their respective individual encrypted group signature quorum portion 91 to the messaging server 5, who may subsequently combine the received quorum portions together and reconstruct the encrypted group signature 151 by applying the corresponding secret blinding factors µ and ρ and message ciphertext portion 129. Accordingly, at step S12-7, the group signature component constructor 37 constructs the encrypted group signature component, denoted as $c_5$, from the final quorum ciphertext portion 127, $c_3$:

$$c_5 = c_3^{\xi^{-1}} \cdot r_d = g^{k_1^{-1}k_2^{-1}k_3^{-1}\xi^{-1}} \cdot r^5 \text{ modulo } n^2$$

where r is the value of the x coordinate of the group curve point 123. As those skilled in the art will appreciate, ξ is a multiplication factor in Lagrange interpolation that is applied in the generation of each individual share, to avoid the need for calculation of modular inverses in evaluating the Lagrange coefficients. More particularly, to compensate for subsequent multiplication by the factor ξ as is known in Lagrange interpolation, r is multiplied by $\xi^{-1}$ modulo n, where $\xi = \Pi_{i=1}^{n_q-1}(n_q-i)$. Advantageously, by adapting the Paillier-based encryption algorithm to evaluate inverses in the exponent modulo n, instead of modulo λ as would be the case with conventional RSA encryption for example, λ is kept secret whereas n is part of the public key.

Continuing the present worked example, the encrypted group signature ciphertext is computed as:

$c_5$=22379359068553326871252872951322516355917916790796029597289974350802259249162
4247585237880510137463247866856195694287802031971575
86952681029628405563979143
37721903931223185810381910742010372877343475228330
6609992596360188784087155

The group signature component constructor 37 of each quorum group member uses Lagrange interpolation to determine that quorum group member's respective contributing shares of $\alpha$ and $\beta$, at step S12-9. At step S12-11, the group signature component constructor 37 generates two ciphertext components, denoted as $(c_\alpha, c_\beta)$, of an encrypted group signature quorum portion 91 for the quorum group member, by applying respective share of $\alpha$ and $\beta$ to the encrypted group signature $c_5$. Advantageously, this implementation effectively carries out encryption of the term $k_1^{-1}k_2^{-1}k_3^{-1}s_k r$ in a distributed fashion by the active quorum group members independently producing two ciphertexts each by using their respective shares of $\alpha$ and $\beta$, again without exposing the secret value of k. The encrypted group signature quorum portions 91 are transmitted, by each respective quorum computing device 3, to the messaging server 5.

Following from the present worked example, the quorum is formed by the group members 1, 3, and 6. For member 1, the Lagrange coefficient, $$\frac{(-3)(-5)}{(-2)(-4)} = \frac{15}{8}$$

multiplied by the factor $\xi=24$, is 45. The member 1 share of $\alpha$ is computed as:

45$e$(1)=(45)·25324789486718477663=
1139615526902331494835

Accordingly, the group signature component constructor 37 of the computing device 3-1 of member 1 produces the first ciphertext component of encrypted group signature quorum portion 91-1:

$c_{\alpha(1)} c_5^{45e(1)} \cdot r_{\alpha(1)}{}^n = g^{k_1^{-1}k_2^{-1}k_3^{-1}r\xi^{-1}45} e(\mathbf{1}) \cdot r_6{}^n$ modulo $n^2$.

Where $r_{\alpha(1)}$ is a randomly chosen value. In the worked example, $c_{\alpha(1)}$=39923469291996547392763180651559016970076296
8716450211115546656276511121781879390298179276827834134722039692923131794064429537588590101136260668254434355122
51273383495484610000478620728381929201343365791836739934828605086644004331

Similarly, the group signature component constructor 37 of the computing device 3-1 of member 1 produces the second ciphertext component of encrypted group signature quorum portion 91-1:

$c_{\beta(1)} = c_5^{45f(1)} \cdot r_{\beta(1)}{}^n = g^{k_1^{-1}k_2^{-1}k_3^{-1}r\xi^{-1}45} f(\mathbf{1}) \cdot r_6{}^n$ modulo $n^2$.

$c_{\beta(1)}$=6065068110130956584887780579416603075617293458839191121535581012855374617898664019237447524680649609594878160437056050470591687952745576562177640836483853
899251909633639186574883861971065113908650934827205
3138714237577683286340

For member 3, the respective Lagrange coefficient multiplied by the factor $\xi$ is −30, and the first ciphertext component to be produced is computed as:

$c_{\alpha(3)} = c_5^{-30e(3)} \cdot r_{\alpha(3)}{}^n$.

With the negative sign in the exponent $c_{\alpha(1)}$ is realised as $$\frac{1}{c_5^{30e(3)}} \text{ modulo } n^2,$$

namely the modular inverse of $c_5^{30e(3)}$. In the worked example,

30$e$(3)=(30)
·143621844835485992917=4308655345064579787510 and the group signature component constructor 37 of the computing device 3-3 of member 3 produces the ciphertext components of encrypted group signature quorum portion 91-3:

$c_{\alpha(3)}$=253902763250609916363235690372394901676173
4502243186335508923624625341384718369558466713034602951839269447370729183206624189274312954774022537777218637239
168090016753500190756629501259018299890236077725791
4245564591402228701654920

$c_{\beta(3)}$=23809280024046886088734091895780311
4563287
52864633939789221839311153472298849
697443911744571575023294329637459979497767068102939
4190507454777745173590109131628120425393640122880462265295270619807921075724248479509380237228064168

For member 6, the respective Lagrange coefficient multiplied by the factor $\xi$ is 9, and the first ciphertext component to be produced is computed as $c_{\alpha(6)} = c_6^{9e(6)} \cdot r_{\alpha(6)}{}^n$.

In the worked example,

9$e$(6)=(9)·378236390201471795507=
3404127511813246159563 and the group signature component constructor 37 of the computing device 3-6 of member 6 produces the ciphertext components of encrypted group signature quorum portion 91-6:

$c_{\alpha(6)}$=67304713798963791942215292221961449907068697406830652907060754214010015422603322638661348432726548943625220430604064855895063845850254609522279261253556851163180787145399653097861230462375013816106752509176583859373764739255661

$c_{\beta(5)}$=25592961559812749789092226328652639449685835357558302067431220775888556248196009455184156630742298455171499445927348163289342737399577298883118812894280301036735751030344575691890381242576855639277717009174735066639039496811979931

Figure 15A:
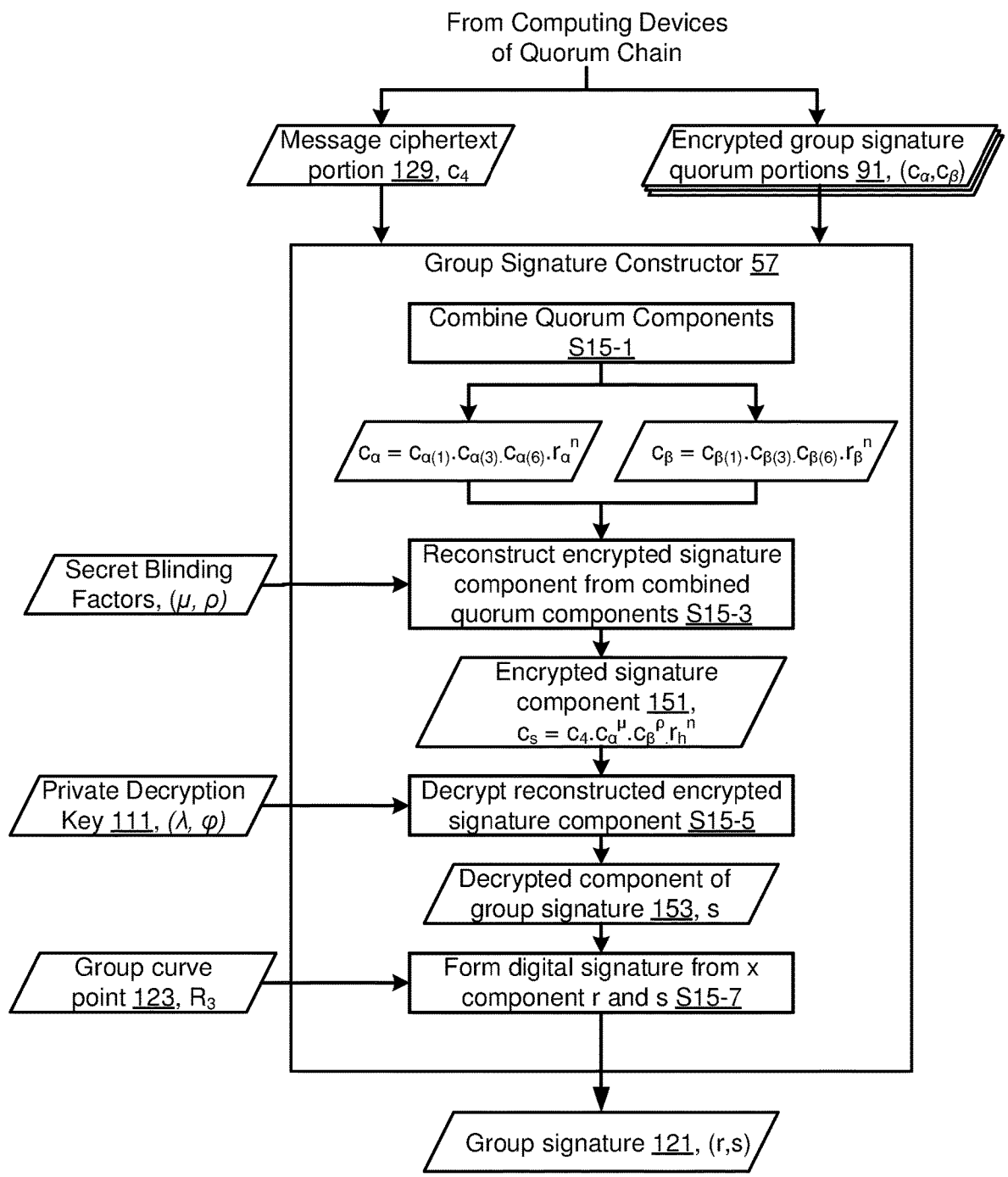
FIG. 15A is a block flow diagram illustrating the process of decrypting a reconstructed encrypted group signature.

FIG. 15A is a block flow diagram illustrating main data elements and processing steps of the group signature verifier 57 of the messaging server 5, to decrypt and verify the reconstructed encrypted group signature. As shown, in this exemplary implementation, the group signature verifier 57 combines the respective ciphertext components of each received encrypted group signature quorum portion 91 to produce corresponding combined ciphertext components of the encrypted group signature, at step S15-1. In the present worked example, the group signature verifier 57 computes the combined ciphertext components as $$c_\alpha = c_{\alpha(1)} \cdot c_{\alpha(3)} \cdot c_{\alpha(6)} \cdot r_\alpha^n$$

and $$c_\beta = c_{\beta(1)} \cdot c_{\beta(3)} \cdot c_{\beta(6)} \cdot r_\beta^n$$

At step S15-3, the group signature verifier 57 uses the secret blinding factors μ and ρ, together with the combined ciphertext components and the message ciphertext portion 129, $c_4$, to reconstruct the encrypted group signature 151, denoted as $c_s$:

$$c_s = c_4 \cdot c_\alpha^\mu \cdot c_\beta^\rho \cdot r_h^n$$

where $r_h$ is a randomly chosen value.
After substitution, the produced result is:

$$c_s = g^{k_1^{-1}k_2^{-1}k_3^{-1}H(m) + k_1^{-1}k_2^{-1}k_3^{-1}r\xi^{-1}\mu(45} e(1) - 30e(3) + 9e$$
$$(5)) + \rho(45f(1) - 30f(3) + 9f(5)) \cdot r_g^n \text{ modulo } n^2$$

It will be appreciated that $c_s = g^s \cdot r_9^n$ modulo $n^2$. In the present worked example, the reconstructed encrypted s-component 151 of the group digital signature 121 is:

$c_s = 1104143187863032119120673080622380722446075143103804606752587801401104187516781810116160070628053953439239804030214959177912078764152425705084081477809411283993918315440123101683953433503202058716913357100641888774227628622017786$

Optionally, prior to decryption of $c_s$, the group signature verifier 57 may produce a check ciphertext, for example as:

$$c_{check} = c_\alpha \cdot c_\beta^{+\rho\theta} = g^{\alpha-\theta-\rho\beta} \cdot r_j^n = g^0 \cdot r_j^n$$

Decryption of $c_{check}$ will produce the value of zero, only if the members of the group have acted honestly in producing their respective encrypted group signature quorum portions 91.

In the present worked example $c_{check} = 6413285176002339645640447496393000814878220718502559903754809542168097326289290844048883695872457082300642872696418731788793275471434116161754002104526964876349460556134559951386574441410755119860361215882931689814113354558600024$ It may be verified offline by an independent calculation that for this value of $c_{check}$, $c_{check}^\lambda = 1 \bmod n^2$ so that decryption of $c_{check}$ produces zero.

In this exemplary embodiment, the group signature constructor 57 performs decryption of $c_s$ at step S15-5, using the private decryption key 111, to produce the s component 153 of the group digital signature 121. As mentioned above, decryption in this exemplary embodiment is implemented by $$s = \frac{c^{\varphi\lambda} - 1}{n} \bmod n.$$

Figure 15B:
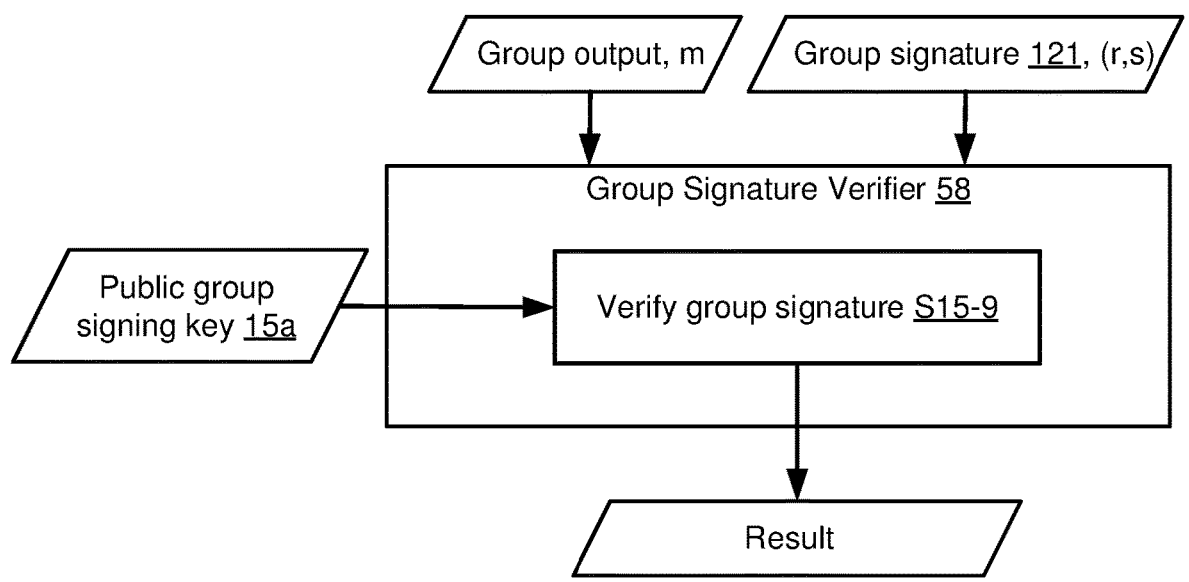
FIG. 15B is a block flow diagram illustrating the process of verifying a reconstructed group signature.

In the present worked example, decrypting $c_s$ gives $s = 9726584587705842155323788723630183339044681051210884 9819514452101062546$ which, when reduced modulo curveorder, produces the decrypted signature component $s = 17906684069671104582.$ At step S15-7, the group signature constructor 57 produces the recovered group digital signature 121, (r, s), where r is the value of the x coordinate of the group curve point 123 and s is the decrypted signature component. In the worked example, the recovered group digital signature 121 is $(r,s) = (6327888113003537979, 17906684069671104582)$ As shown in FIG. 15B, at step S15-9, the group signature verifier 58 verifies the recovered group digital signature 121 is correct by using the group's public signature key 15a.

Anyone, including members of the group, with access to the public group signing key, the group output document or file, m, and the signature (r, s) can verify the group signature. Group members can check that the quorum signing subgroup have correctly produced the group's signature.

In a modified implementation of the verification process as discussed above with reference to FIG. 8, the group digital signature 121 may be verified by reproducing the point $R = (r_x, r_y)$ from the s component 153 of the group digital signature 121, and checking that $r_x$ is equal to r. The first step is to determine $s^{-1}$ modulo curveorder. As curveorder is prime, $$s^{-1} = s^{curveorder-2} \text{ modulo curveorder.}$$

Alternatively $s^{-1}$ may be determined by using the extended Euclidean algorithm. In the worked example, $s^{-1}$ is computed as $$s^{-1} = 14278096630350458202$$

To compute the verification point, a first variable $w_1 = H(m)s^{-1}$ modulo curveorder is calculated, which in the worked example is $$w_1 = 2631939446596170749$$

A second variable $w_2 = rs^{-1}$ modulo curveorder is calculated, which in the worked example is $$w_2 = 12673010092071164627$$

Figure 16:
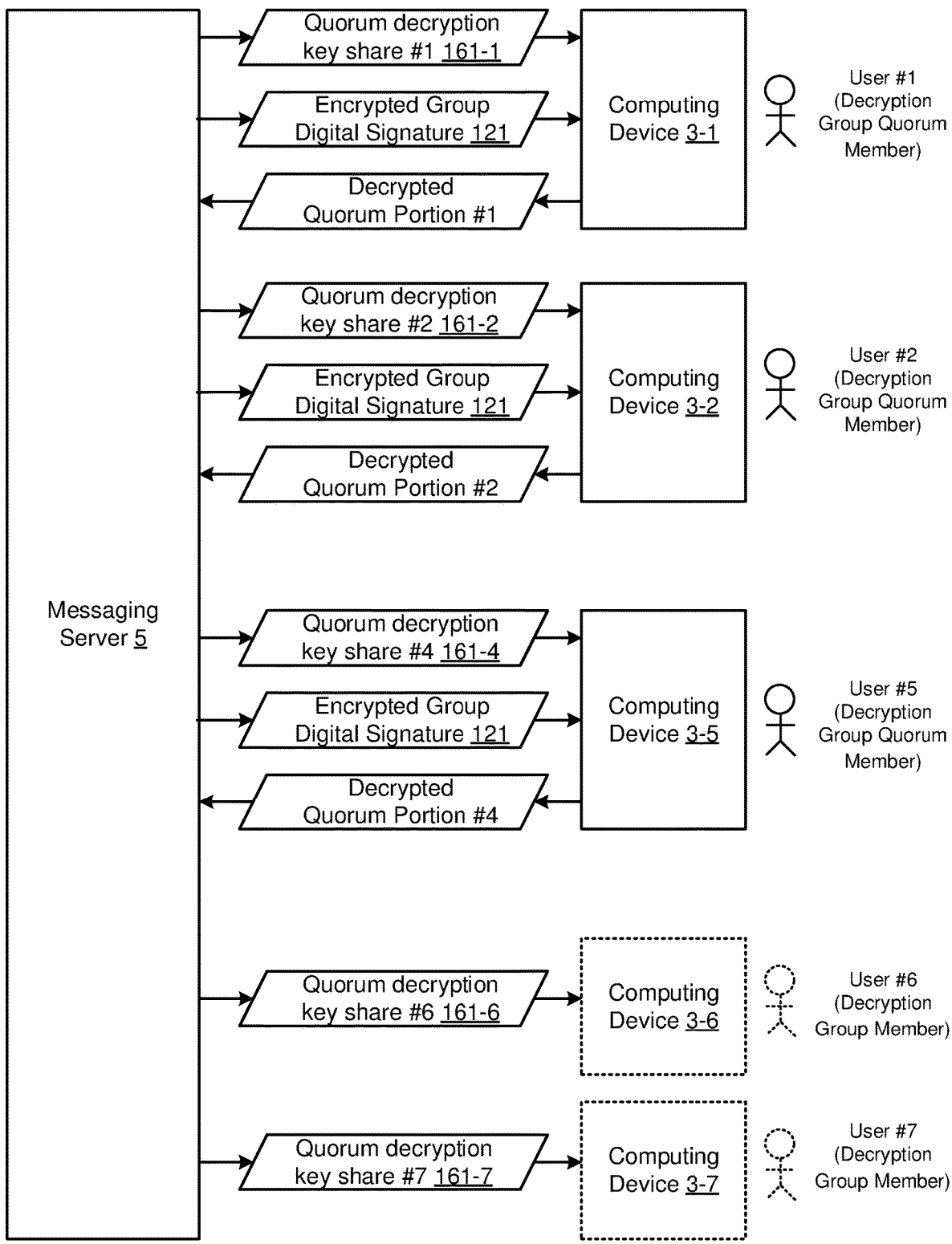
FIG. 16 is a block flow diagram schematically illustrating a worked example in which decryption of the reconstructed encrypted group signature is carried out by members of a decryption group.

The point on the curve $w_1P$ is found with the result $w_1P = (2940816826348654721, 7088596893413615807)$ With the public key point $G = s_kP = (17205704574296179713, 12235039281133176884),$ The point on the curve $w_2G$ is found and $w_2G = (7830368741234977123, 10292107626219131043)$ If the s component in the group signature 121 is correct, the sum of the two computed points will be equal to R. In the worked example, the sum of the points $w_3P = w_1P + w_2G$ is determined as $(2940816826348654721, 7088596893413615807) +$
$(7830368741234977123, 10292107626219131043) =$
$(6327888113003537979, 8888006501170527626)$ The group digital signature 121 is verified because the point $w_3P$ has the x coordinate equal to the part r of the signature, $r = 6327888113003537979.$ FIG. 16 is a block diagram illustrating another embodiment, in which the decryption of the reconstructed encrypted group signature component 151, $c_s$, is carried out by members of a decryption group in a threshold or quorum manner, instead of by the messaging server 5 as discussed in step S15-5 above. In this alternative embodiment, the private group decryption key 111, ($\lambda$, $\varphi$), as generated by the group encryption key generator 59, is distributed as secret shares amongst members of a decryption group so that no individual in the decryption group knows $\lambda$ or can learn $\lambda$ by carrying out quorum based decryption. Each quorum member uses their respective private key share, their share of $\lambda$, to produce a partial decryption which is sent to the admin server for combining to produce s. It is appreciated that the decryption group may be a separate, independent group to the ad hoc communication group 9, or may include members of the ad hoc group.

As discussed in the above embodiments, $\lambda$ is the Paillier-based private key component needed to determine s from the final calculated Paillier-based encrypted group signature component 151, and needs to be kept secret. In this alternative embodiment, $\lambda$ is blinded by a random factor $\varphi$ retained by the messaging server 5, split into secret shares 161 by the messaging server 5 and individually encrypted for distribution to the decryption group members. The private decryption key splitting into shares 161 is implemented using values from another Lagrange polynomial, denoted as h(x) which has degree 2 because in this example the quorum size is 3:

$$h(x) = \frac{\varphi \lambda}{\xi} + h_1 x + h_2 x^2$$

As discussed above, the factor in h(x) above is provided in order to avoid modular inversion in subsequent Lagrange interpolation. Modular inverses may be determined by the extended Euclidean algorithm to determine values a and b such that ax+by=1. The modular inverse of x is a since ax modulo y=1, x and y must be relatively prime for a to exist. It is also to be noted that because $$\frac{\varphi \lambda}{\xi}$$

is used in decryption which operates modulo n$^2$ the group member shares of $$\frac{\varphi \lambda}{\xi}$$

need to be evaluated modulo n$^2$ and not modulo n.

In the following worked example, there are five decryption group members holding decryption key shares 161 and any three members can form a decryption quorum. Regarding the point about modular inversion in Lagrange interpolation, consider that the three quorum members hold the shares h(u), h(v) and h(w).

In conventional Lagrange interpolation the secret h(0) is given by:

$$h(0) = \frac{h(u)vw}{(u-v)(u-w)} + \frac{h(v)uw}{(v-w)(v-w)} + \frac{h(w)uv}{(w-u)(w-v)} \bmod n^2$$

The denominators are realised normally by carrying out modular inversion but as there are some values whose inverses do not exist modular inversion needs to be avoided by utilising the factor $\xi$. Multiplying by the above expression for h(0) becomes $$\xi h(0) = \frac{\xi h(u)vw}{(u-v)(u-w)} + \frac{\xi h(v)uw}{(v-w)(v-w)} + \frac{\xi h(w)uv}{(w-u)(w-v)} \bmod n^2$$

By setting $\xi = \Pi_{i=1}^{n_q-1}(n_q - i)$, each denominator will divide regardless of which decryption group members form the quorum. In the 3 out of 5 example, $\xi=4.3.2.1=24$.

With randomly chosen values for h$_1$ and for h$_2$ the polynomial h(x) becomes:

25584709773021936797499051628715557246054634308104077733557291757252738122771 +

26132399765738470157269227585161628645203372864293396093357095765718639469137588819637636844 7-

52895369599290019203839569539830505020929367121709608355845 +

10215921060938613855341906478228755650496439898290461 76x +

7771366452959185024141548425318519434294772929553197 2x$^2$

The respective decryption group members' shares 161 are:

h(1)=25584709773021936797499051628715557246054634308104077733557291757252738122771261323997657384701572692275851628645203372864520337286429339609335709576 57186394691375888196376368447528954795298670815491631471004437126581688759713428732933993 h(3)=25584709773021936797499051628715557246054634308104077733557291757252738122771261323997657384701572692275851612864520337286429339609335709576571 86394691375888196376368447528957460192199239949204470709606797814373602583242755282121 h(4)=25584709773021936797499051628715557246054634308104077733557291757252738122771261323997657384701572692275851612864520337286429339609335709576571 8639469137588819637636844752895902577995704095354169480864439298629905286133765305 2101 h(5)=25584709773021936797499051628715557246054634308104077733557291757252738122771261323997657384701572692275851612864520337286429339609335709576571 8639469137588819637636844752896074679504390114157940173865049452861318903489114188 6025

The decryption group members use their secret shares 161 of the blinded private key $\varphi\lambda$ to decrypt c$_s$ to produce s in a combined calculation. Advantageously, as decryption is carried out independently from production of the signature ciphertext, in this alternative implementation, the quorum size for the decryption group may even be different from the quorum size that produced the ciphertext $c_s$.

In the present worked example, as shown in FIG. 16, a quorum decryption group is formed by members 1, 2, and 5, to carry out the decryption of $c_s$. For decryption group member 1, the Lagrange coefficient times $\lambda$ is $$\frac{24(-2)(-5)}{(-1)(-4)} = 60$$

and so that decryption key fragment holder's share of $\varphi\lambda$ is 60h(1). Member 1 produces the intermediate decryption result $$d_1 = c_s^{60h(1)}$$

where

60h(1)mod
$n^2$=208656567679989227293107939101540911676
01520750332921171514935987682708399090
55 resulting in $d_1$=606778779732886784477559985144045740597831131007486
50615964623995248501065044
900248019619450912150396995652655710066633779389978075749165533074957515646172 6

For decryption group member 2 the Lagrange coefficient times $\xi$ is $-40$ and so that decryption key fragment holder's share of $\varphi\lambda$ is $-40h(2)$. With the negative sign in the exponent $d_2$ is realised as $$d_2 = \frac{1}{c_s^{40h(2)}} \text{ modulo } n^2,$$

namely the modular inverse of $c_s^{40h(2)}$.
where

40h(2)mod
$n^2$=18576026980690741329199172224607229030921427527835816502284475809114790495166630074930189123418255174107882896429704256888719050785042352218649817517573314 resulting in $d_2$=85712151781299165855356438645409087965098133820230213083567382111917772806696
33728213947228991967768978266055321618277412520649
8021296477979152173750762 28

For decryption group member 5, the Lagrange coefficient times $\xi$ is 4 and so that decryption key fragment holder's share of $\varphi\lambda$ is 4h(5), where 4h(5)mod
$n^2$=185760269806907413291991722246072290309214275277835816502284475809114790495166504880989581129881879309344421971882698647764216912806934245551151959301476 3591 resulting in $d_3$=22449352247725365071243176765235034864039315005588556144340377476757644317033
34192378936506884374479255039067870739406376092046
6413642423002512204139976 83 705

One of the computing devices 3 of the decryption group, for example a nominated member of the decryption group, produces the product of the intermediate decryption results from all participating members of the quorum decryption group, and transmits the result to the messaging server 5 as the decrypted s-component 153 of the group digital signature 121. In the worked example, the computed product is:

$$d_4 = d_1 d_2 d_3 \bmod n^2 = c_s^{60h(1)-40h(2)+4h(5)} = c_s^{\frac{\xi\varphi\lambda}{\xi}} = c_s^{\varphi\lambda} \bmod n^2 =$$

162361260425582733437511280167031460874977156554093340539797849535572654869118212475086227954-65764420305389135301323406860517456724276178542894290874 7

The messaging server 5 receives the decrypted s-component 153 and removes the blinding factor $\varphi$ by calculating $$d_5 = d_4^{-\varphi}$$

and recovers the value of s of the digital signature 121 by computing $$s = \frac{d_5 - 1}{n} \text{ modulo } curveorder$$

In the present worked example, it is found that s=97265845877058421553237887236301833390446810512108849819514452101062546 which, after modulo curveorder, is s=17906684069671104582 resulting in the same recovered group digital signature 121 as computed in step S15-7 above.

Optionally, each partial decrypted quorum portion $d_1$, $d_2$ and $d_3$ may be encrypted by the computing device 3 of the respective quorum decryption member prior to transmission to the messaging server 5. The messaging server 5 may then calculate firstly $d_5 = (d_1 d_2 d_3)^{-\varphi}$ then secondly, $$s = \frac{d_5 - 1}{n} \text{ modulo } curveorder.$$

Figure 17:
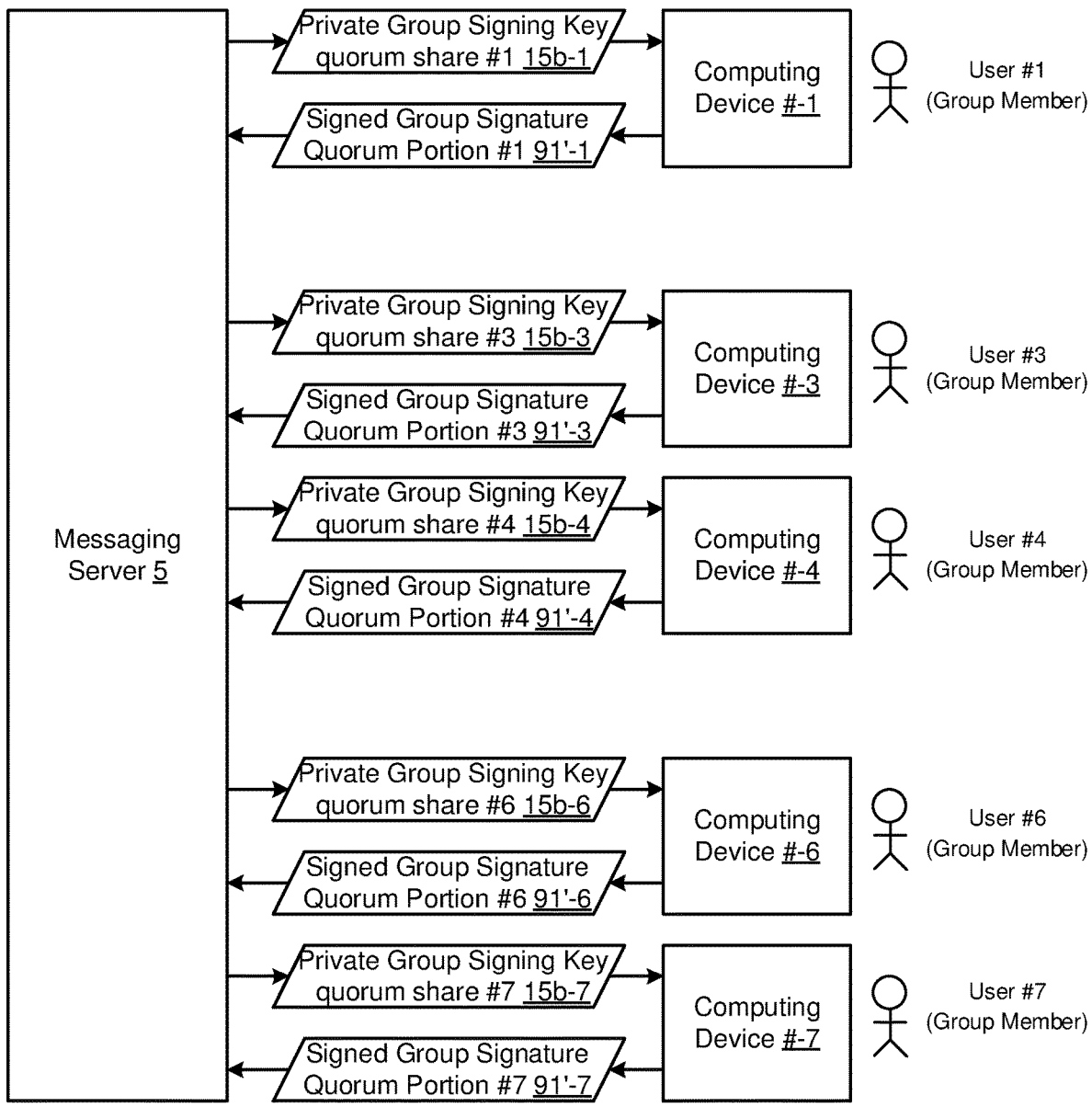
FIG. 17 is a block flow diagram schematically illustrating a worked example in which each group signature quorum portion is digitally signed using the corresponding user's private signing key.

In the embodiments described above, the group signature quorum portions 91 are encrypted ciphertext portions. FIG. 17 is a block flow diagram schematically illustrating a further alternative embodiment in which the group signature quorum portions 91 are not group-encrypted. Instead, each group signature quorum portion 91' is digitally signed using the corresponding user's private signing key 17b, and verified by the messaging server 5 using the respective public signing key 17b.

Example Computer System Implementation

Figure 18:
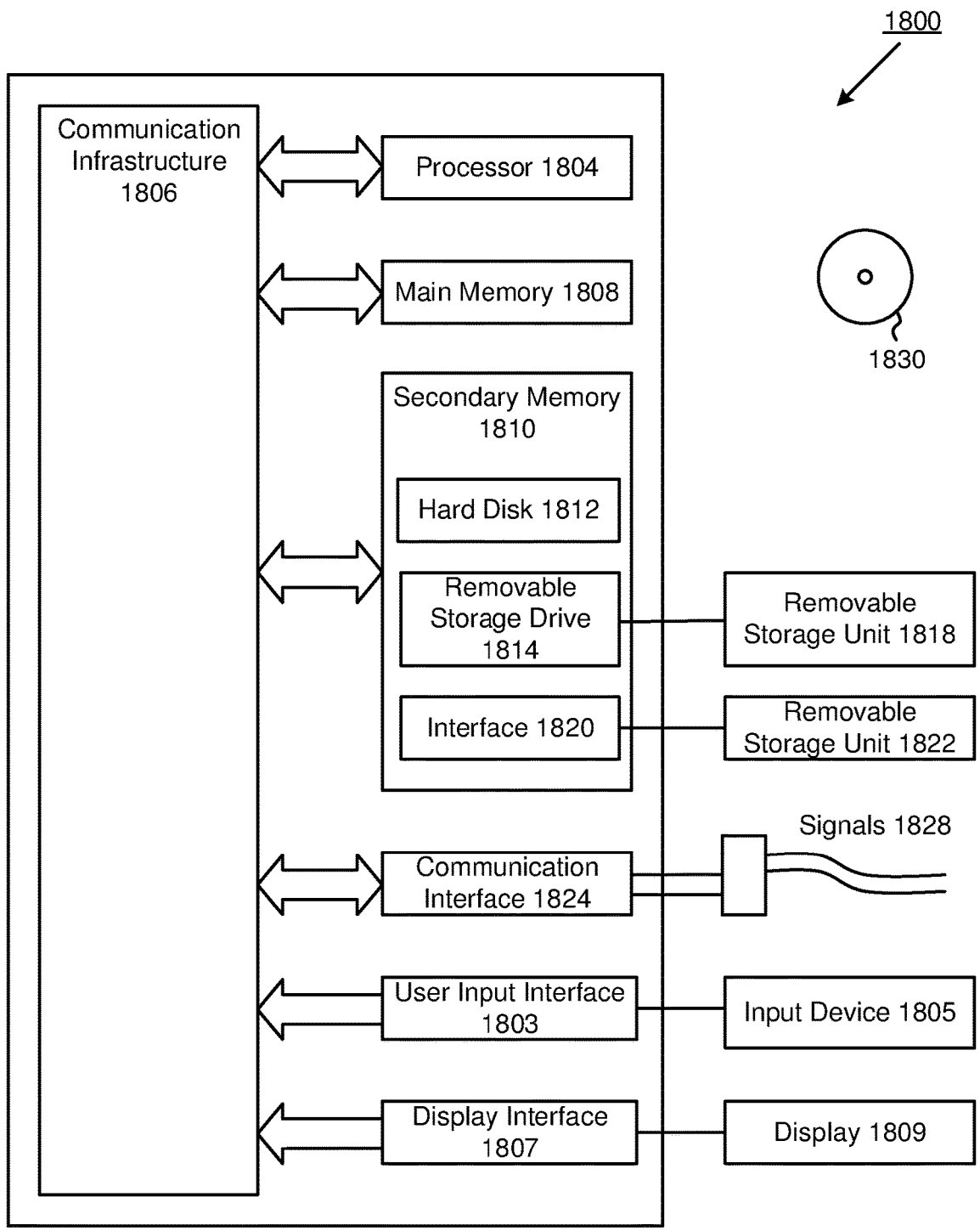
FIG. 18 is a diagram of an example of a computer system on which one or more of the functions of the embodiments may be implemented.

FIG. 18 illustrates an example computer system 1800 in which the present invention, or portions thereof, can be implemented as computer-readable code to program processing components of the computer system 1800. Various embodiments of the invention are described in terms of this example computer system 1800. For example, the processing modules and memory of the computing device 3 in FIGS. 1 and 2 can be implemented in such a system 1800. The processing modules and memory of the server 5 in FIGS. 1 and 3 can also be implemented in such a system 1800. The methods illustrated by the flowchart of FIGS. 4, 5, 7, 8, 10, 11, 12, 13, 14, 15A, 15B and/or 16 can also be implemented in system 1800. After reading this description, it will become apparent to a person skilled in the relevant art how to implement the invention using other computer systems and/or computer architectures.

Computer system 1800 includes one or more processors, such as processor 1804. Processor 1804 can be a special purpose or a general-purpose processor. Processor 1804 is connected to a communication infrastructure 1806 (for example, a bus, or network). Computer system 1800 also includes a user input interface 1803 connected to one or more input device(s) 1805 and a display interface 1807 connected to one or more display(s) 1809, which may be integrated input and display components. Input devices 1805 may include, for example, a pointing device such as a mouse or touchpad, a keyboard, a touchscreen such as a resistive or capacitive touchscreen, etc. According to an embodiment, computer display 1830, in conjunction with display interface 1802, can be used to display the UI 25 of the messaging client 23.

Computer system 1800 also includes a main memory 1808, preferably random access memory (RAM), and may also include a secondary memory 1810. Secondary memory 1810 may include, for example, a hard disk drive 1812, a removable storage drive 1814, flash memory, a memory stick, and/or any similar non-volatile storage mechanism. Removable storage drive 1814 may comprise a floppy disk drive, a magnetic tape drive, an optical disk drive, a flash memory, or the like. The removable storage drive 1814 reads from and/or writes to a removable storage unit 1818 in a well-known manner. Removable storage unit 1818 may comprise a floppy disk, magnetic tape, optical disk, etc. which is read by and written to by removable storage drive 1814. As will be appreciated by persons skilled in the relevant art(s), removable storage unit 1818 includes a non-transitory computer usable storage medium having stored therein computer software and/or data.

In alternative implementations, secondary memory 1810 may include other similar means for allowing computer programs or other instructions to be loaded into computer system 1800. Such means may include, for example, a removable storage unit 1822 and an interface 1820. Examples of such means may include a program cartridge and cartridge interface (such as that found in video game devices), a removable memory chip (such as an EPROM, or PROM) and associated socket, and other removable storage units 1822 and interfaces 1820 which allow software and data to be transferred from the removable storage unit 1822 to computer system 1800.

Computer system 1800 may also include a communications interface 1824 implemented for example at the operating system level to allow software and data to be transferred between computer system 1800 and external devices, for example as signals 1828 over a communication channel. Communications interface 1824 may include a modem, a network interface (such as an Ethernet card), a communications port, a PCMCIA slot and card, or the like.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 1800, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 1818, removable storage unit 1822, and a hard disk installed in hard disk drive 1812. Computer program medium, computer readable storage medium, and computer usable medium can also refer to memories, such as main memory 1808 and secondary memory 1810, which can be memory semiconductors (e.g. DRAMs, etc.). These computer program products are means for providing software to computer system 1800.

Computer programs are stored in main memory 1808 and/or secondary memory 1810. Computer programs may also be received via communications interface 1824. Such computer programs, when executed, enable computer system 1800 to implement the present invention as described herein. In particular, the computer programs, when executed, enable processor 1804 to implement the processes of embodiments of the present invention as described above. Accordingly, such computer programs represent controllers of the computer system 1800. Where the invention is implemented using software, the software may be stored in a computer program product and loaded into computer system 1800 using removable storage drive 1814, interface 1820, hard drive 1812, or communications interface 1824.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Alternative Embodiments

It will be understood that embodiments of the present invention are described herein by way of example only, and that various changes and modifications may be made without departing from the scope of the invention.

For example, it will be apparent to the skilled practitioner that simpler, alternative embodiments may be realised if there is established trust between the members of the group so that there is less risk of collusion or dishonest behaviour. For example, instead of the private signing key $s_k$ being represented as $s_k = \mu\alpha + \rho\beta$ mod curveorder where $\mu$, $\rho$ and $\beta$ are randomly chosen blinding factors designed to preserve secrecy, $s_k$ may simply be represented as $s_k = \alpha$. In this case only the value of $\alpha$ is secret shared by the messaging server and distributed to each member of the group. This simplifies the system, reducing the processing that needs to be carried out by each group member.

As another possible modification, secure communications between members of the group 9 may be carried out using an integrated encryption scheme, such as the Elliptic Curve Integrated Encryption Scheme (ECIES) where a random session key is used to encrypt the information to be sent using an authenticated symmetric key system, such as an AES-based key system. The session key may be constructed in a Diffie-Hellman manner using a public encryption key of the recipient so that only the recipient may decrypt the ciphertext using their corresponding private key.

It will also be apparent that members of the group need not necessarily be individuals, but they may be hardware units, designed to carry out the necessary calculations, or a number of computer servers networked together, or any combination thereof.

Reference in this specification to "one embodiment" are not necessarily all referring to the same embodiment, nor are separate or alternative embodiments mutually exclusive of other embodiments. In particular, it will be appreciated that aspects of the above described embodiments can be combined to form further embodiments. Similarly, various features are described which may be exhibited by some embodiments and not by others. For example, it will be appreciated that although the respective processes and associated processing modules are described as separate embodiments, aspects of the described embodiments can be combined to form further embodiments. For example, each of the individual processes outlined in FIG. 4 may form respective embodiments, either individually or in combination with aspects of other related processes. As one example, the messaging server may be configured to perform the process of verifying users based on digital commitment signatures, prior to forming of an ad-hoc communication group, according to an embodiment. As another example, the messaging server may be configured to verify a group digital signature from a predefined minimum number of quorum components, each generated from a respective share of a group signing key, according to an embodiment. As yet another example, computing devices are configured to participate in the collective digital signing of a group data output without having, nor being able to learn, full knowledge of all of the data components required to fully group sign the data, according to an embodiment.

As yet another alternative, one or more of the processing modules of the computing devices and/or messaging server may be provided as one or more distributed computing modules or processing services on a remote/distributed server that is in communication with the communication system via the data network. Additionally, as those skilled in the art will appreciate, functionality of the described modules may be provided as one or more application programming interfaces (API) accessible by an application program running on the device or server, such as the messaging client on the computing device, or as a plug-in module, extension, embedded code, etc., configured to communicate with an application program.

Yet further alternative embodiments may be envisaged, which nevertheless fall within the scope of the following claims.

The invention claimed is:

1. A method for implementing communication of data between a group of users in a communication system, comprising:
generating, by a server of the communication system, a plurality of quorum portions of a group signing key;
providing, by the server, at least one of said plurality of quorum portions of the group signing key to each of a plurality of devices of the group of users, to configure each device to become operable to generate an encrypted portion of a group digital signature using a corresponding quorum portion of the group signing key;
receiving, by the server, a predetermined minimum number of encrypted portions of the group digital signature, each generated by a respective device of the group of users; and
combining, by the server, the predetermined minimum number of encrypted portions of the group digital signature to construct an encrypted group digital signature.

2. The method of claim 1, further comprising decrypting, by the server, the encrypted group digital signature.

3. The method of claim 1, further comprising:
generating, by the server, a plurality of quorum portions of a group decryption key;
providing, by the server, at least one of said plurality of quorum portions of the group decryption key to each of a plurality of devices of a decryption group;
transmitting, by the server, the predetermined minimum number of encrypted portions of the group digital signature to the decryption group; and
receiving, by the server, a decrypted group digital signature from the decryption group.

4. The method of claim 1, wherein the group signing key is a private group signing key, the method further comprising verifying the encrypted group digital signature using a corresponding public group signing key.

5. The method of claim 4, wherein each quorum portion of the group signing key comprises respective contributing shares of first and second components of the private group signing key.

6. The method of claim 5, wherein the predetermined minimum number of encrypted portions of the group digital signature are each generated from the respective contributing shares of each user in the group of users.

7. The method of claim 1, wherein a predefined minimum number of devices of the group of users form a chain of quorum devices to generate a quorum signature component using their respective quorum portions of the group signing key.

8. The method of claim 7, further comprising receiving a quorum-signed group signature quorum portion, generated by one of the predefined minimum number of devices of the group of users using the quorum signature component to digitally sign group data that is output by the group of users.

9. The method of claim 8, wherein the group data comprises one or more data files and/or communication events produced by the group of users.

10. The method of claim 1, wherein the plurality of quorum portions of the group signing key are generated using secret parameters that are not communicated by the server or each user in the group of users.

11. The method of claim 1, wherein the group signing key and the plurality of quorum portions of the group signing key are purged from the server after provision to each of the plurality of devices of the group of users.

12. The method of claim 1, further comprising generating and verifying, by the server, check ciphertexts to determine that the predetermined minimum number of encrypted portions of the group digital signature are constructed correctly.

13. A method according to claim 1, wherein the group of users are selected from devices that have returned an irrevocable message that is generated by digitally signing a commitment message with a cryptographic signature.

14. A computer-implemented method, comprising:
receiving, by a device of a user in a group of users in a communication system, a quorum portion of a group signing key;

communicating, by the device, a group data output to devices of other users in the group of users;

generating, by the device, a portion of a group digital signature by digitally signing the group data output based at least on the received quorum portion of the group signing key;

encrypting, by the device, the generated portion of a group digital signature using a public group encryption key; and transmitting, by the device, the encrypted portion of the group digital signature to a server in the communication system, wherein the server reconstructs a group digital signature from a predetermined minimum number of encrypted portions of the group digital signature generated by respective devices of the group of users.

15. The computer-implemented method of claim 14, further comprising:

receiving, by the device, a public group encryption key based on a homomorphic encryption scheme; and encrypting, by the device, the generated portion of the group digital signature using the public group encryption key to output a malleable encrypted portion of the group digital signature.

16. The computer-implemented method of claim 14, further comprising generating, by a chain of quorum devices including the device, a quorum signature component using respective quorum portions of the group signing key, wherein the quorum signature component is used to sign the group data output by the group of users to generate the portion of the group digital signature.

17. A system for implementing communication of data between a group of users in a communication system, the system comprising a computer processor configured to perform a method of:

generating, by a server of the communication system, a plurality of quorum portions of a group signing key;

providing, by the server, at least one of said plurality of quorum portions of the group signing key to each of a plurality of devices of the group of users, to configure each device to become operable to generate an encrypted portion of a group digital signature using a corresponding quorum portion of the group signing key;

receiving, by the server, a predetermined minimum number of encrypted portions of the group digital signature, each generated by a respective device of the group of users; and combining, by the server, the predetermined minimum number of encrypted portions of the group digital signature to construct an encrypted group digital signature.

18. A non-transitory computer-readable medium comprising computer-executable instructions that when executed on a computing device perform a method for implementing communication of data between a group of users in a communication system, the method comprising:

generating, by a server of the communication system, a plurality of quorum portions of a group signing key;

providing, by the server, at least one of said plurality of quorum portions of the group signing key to each of a plurality of devices of the group of users, to configure each device to become operable to generate an encrypted portion of a group digital signature using a corresponding quorum portion of the group signing key;

receiving, by the server, a predetermined minimum number of encrypted portions of the group digital signature, each generated by a respective device of the group of users; and combining, by the server, the predetermined minimum number of encrypted portions of the group digital signature to construct an encrypted group digital signature.

* * * * *